United States Patent
Sundaresan et al.

(10) Patent No.: US 6,463,079 B2
(45) Date of Patent: *Oct. 8, 2002

(54) PROCESSING ORDERS FOR HIGH BANDWIDTH CONNECTIONS

(75) Inventors: Vinu Sundaresan, Fremont; Krishna Sastry Garimella, San Jose; Umesh Bellur; Arun Candadai, both of Sunnyvale; Michael Jean Walsh, Santa Clara; Ralph Gordon Saavedra, San Ramon; Madhu Gopinathan, Sunnyvale; Yan Or, San Ramon, all of CA (US)

(73) Assignee: Covad Communications Group, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,056

(22) Filed: Jul. 2, 1999

(65) Prior Publication Data

US 2002/0101881 A1 Aug. 1, 2002

(51) Int. Cl.[7] .................................................. H04J 3/16
(52) U.S. Cl. ........................................ 370/468; 709/226
(58) Field of Search ................................ 370/468, 480, 370/493, 490, 489, 535, 259, 465; 375/219, 220; 709/223, 226, 227, 228, 229; 379/201, 220, 222

(56) References Cited

U.S. PATENT DOCUMENTS 6,028,867 A * 2/2000 Rawson et al. ............. 370/463
6,249,578 B1 * 6/2001 Gilles et al. ................ 379/221

* cited by examiner

Primary Examiner—Ricky Ngo
(74) Attorney, Agent, or Firm—Jung- hua Kuo

(57) ABSTRACT

An operational support system (OSS) processing orders for high bandwidth connections on based on digital subscriber loop (DSL) technology. The OSS pre-qualifies the services based on data identifying a user location and on the availability of any resources which may be needed exclusively for the user location to provide the service. A port on a DSL access multiplexor (DSLAM) is an example of such a resource. By reserving such resources around (before or after) the pre-qualification stage, the OSS may ensure that the service order can be fulfilled with an enhanced probability.

19 Claims, 31 Drawing Sheets

COVAD™ | contact_s.gif (9349 bytes)

All fields marked with \* [Click here for help on how to complete this form]
must be completely filled out.

///CUSTOMER INFORMATION:///

Corporation/ISP Name: Test Customer
Contact Name:
Contact Email: [        ]
A confirmation will be sent to the above email address. If the address is incorrect, please enter the correct one and notify Covad Customer Care immediately.

///CLIENT INFORMATION:///

Client Last Name: [        ]
Client First Name: [        ]
Installation Address: [        ]
Unit: [        ]
City: [        ]
State: [   ]
ZIP Code: [     ]
Installation Telephone: ([    ]) [    ]-[    ]

[CONTINUE] [SAVE] [CLEAR]

Return to Customer Care Center Main Menu.

Copyright © 1997-1998 Covad Communications Company. All Rights Reserved.
webmaster@covad.com
Contact Covad at: 1-888-GO-COVAD

FIG. 12A

PROCESSING ORDERS FOR HIGH BANDWIDTH CONNECTIONS

RELATED APPLICATIONS

The present application is related to the following U.S. Patent Applications, which are all incorporated by reference into the present application:

(1) Co-pending application entitled, "Rolling Out High Bandwidth Connection Services in Geographical Areas Covering Several Central offices", Ser. No.: 09/347,434, and filed on even date herewith;

(2) Co-pending application entitled, "Determination of DSL-Based Services Possible (Feasible) to a User Location", Ser. No.: 09/347,058, and filed on even date herewith;

(3) Co-pending application entitled, "Securing Local Loops fr Providing High Bandwidth Connections", Ser. No.: 09/347,055, and filed on even date herewith; and (4) Co-pending application entitled, "Provisioning Virtual Circuits for High Bandwidth Connections", Ser. No.: 09/347,057, and filed on even date herewith.

BACKGROUND OF THE INVENTION

1. Field of the Invention

The present invention relates to telecommunications, and more specifically to an operational support system (OSS) which may be used by a provider of high bandwidth connections to users at locations such as homes and offices.

2. Related Art

Service providers often provide high bandwidth connections to users. Examples of such service providers include incumbent local exchange carriers (ILECs) such as PacBell of California, competitive local exchange carriers (CLECs) such as Covad Communications Group, Inc. (the assignee of the subject patent application). The ILECs and CLECs are commonly referred to as LECs in the present application.

Efficient and effective delivery of high bandwidth connection services often requires coordination of several tasks and use of related information. The tasks may be performed in several 'stages' of the service delivery process. For example, in an initial set-up stage, a service provider may need to setup several types of equipment before being able to deliver service.

The status of the tasks in the set-up stage may impact tasks in other stages as well. For example, a service provider may not be able to accept orders for the service in an area unless service is already available in the area or until there is an indication of expected date of availability of the service in the area.

Furthermore, the interface to accept such orders may need to be simple and user-friendly. The expectations of the requester of the service may need to be quickly and/or accurately set. Once an order is received, the order may also need to be processed efficiently, at least to minimize the associated overhead for a service provider.

SUMMARY OF THE INVENTION

The present invention relates to processing orders for digital subscriber loop (DSL) based services specifying high bandwidth connections. In accordance with the present invention, an operation support system (OSS) pre-qualifies a user location for the service while taking into consideration any resources required exclusively for providing the services to the user location. Pre-qualification generally refers to making a preliminary determination of the feasibility of providing the requested service.

A port on a digital subscribe loop access multiplexor (DSLAM) is an example of a resource used exclusively for the user location. The ports together may be viewed as a type of it resource, and each port may be viewed as an instance of the resource type. The operational support system may determine if a user location requires an instance of a resource type exclusively, and reserves one of the instances of the resource type for the user location. Thus, operational support system may ensure the availability of such resources for fulfilling the service order upon pre-qualification.

The results of pre-qualification may be immediately made available to the requestor so that the requestor knows that the service is available at least with some level of high probability. The results may be made available, for example, on a web page if a requestor is entering an order on web pages or via email if the user wishes email notification.

In addition, the operational support system may assign and reserve a DSLAM port capable of providing the services requested for a user location. As is well known in the relevant arts, if the length of the local loop exceeds approximately 14,000 feet, only IDSL may be an option, in which case a maximum bandwidth of 144 Kbps may be provided. For lesser distances and with an end-to-end metallic local loop, ADSL may be a possibility, which supports much higher bandwidth.

Actual availability of the service may be determined later accurately. The results of pre-qualification may be found to be in error later. The resolution in such situations may require manual intervention. However, requestor satisfaction may be enhanced due to the early indication of availability of service, at least when the pre-qualification results are accurate.

In one embodiment, the requestor may provide data identifying a user location (at which the service is to be provided), and the desired service (e.g., speed). The operational support system may receive the data and determine whether the desired services cannot be provided either due to technological limitations (local loop length limitations, etc.) or due to business considerations (e.g., it may not be desirable to provide high bandwidth connections between distant locations as the performance throughput for other users may be impacted). The operational support system further determines the availability of the resources (e.g., DSLAM ports) used exclusively for the services specified in the received order.

The operational support system may reserve any such resources for the user location in the service order, and then communicate the results of the pre-qualification to the requestor. However, one problem with such a system is that the requestor may not be clear on what service options are available, and may thus select a sub-optimal service.

Accordingly, in an alternative embodiment, a requestor first provides data identifying the user location. The operational support system may examine the data to determine all the possible services for that user location. The requestor may be provided the ability to select from among the determined possible services. As a result, the requestor may make an informed choice from the available services. Operational support system may reserve the resources required exclusively for the user location, for example, immediately after receiving the choice from the requestor.

Therefore, the present invention may be used by service providers to first provide a preliminary indication of the possibility of providing a desired service, and then later determine actual feasibility of providing the service.

The present invention may enhance satisfaction of a requestor as the requestor knows quickly whether the desired services are feasible from a specific DSL service provider.

The present invention enhances the probability of fulfilling a service order according to the pre-qualification as the resources (e.g., DSLAM port) used exclusively for a user location are reserved for the user location.

The present invention is useful for an ISP (Internet service provider) as the end users (e.g., from home) accessing a target network provided by the ISP may use forms provided on a web server to request the high bandwidth connections to the target network.

The present invention enables a requestor to select an optimal service type by first indicating all the feasible services which may be provided to a user location and having the requestor select from among the feasible services.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 12A and 12B are display screens illustrating with an example the manner in which service orders can be entered;

DETAILED DESCRIPTION OF THE PREFERRED EMBODIMENTS

I. Overview and Discussion of the Present Invention

An operational support system (OSS) in accordance with the present invention may be used by a service provider providing high bandwidth connections to many users. The OSS system may enable information at various stages to be coordinated to enable the service provider to provide efficient and effective services (i.e., providing high bandwidth connections). The stages may cover the time duration in which a service provider determines to provide service in a particular area, the time duration in which infra-structure necessary for providing the service to additional users is being constructed (built) and the time duration when service is actually being delivered.

Several aspects of the present invention can be better appreciated in reference to an example environment. Accordingly, an example environment is described below.

H. Example Environment

Figure 1:
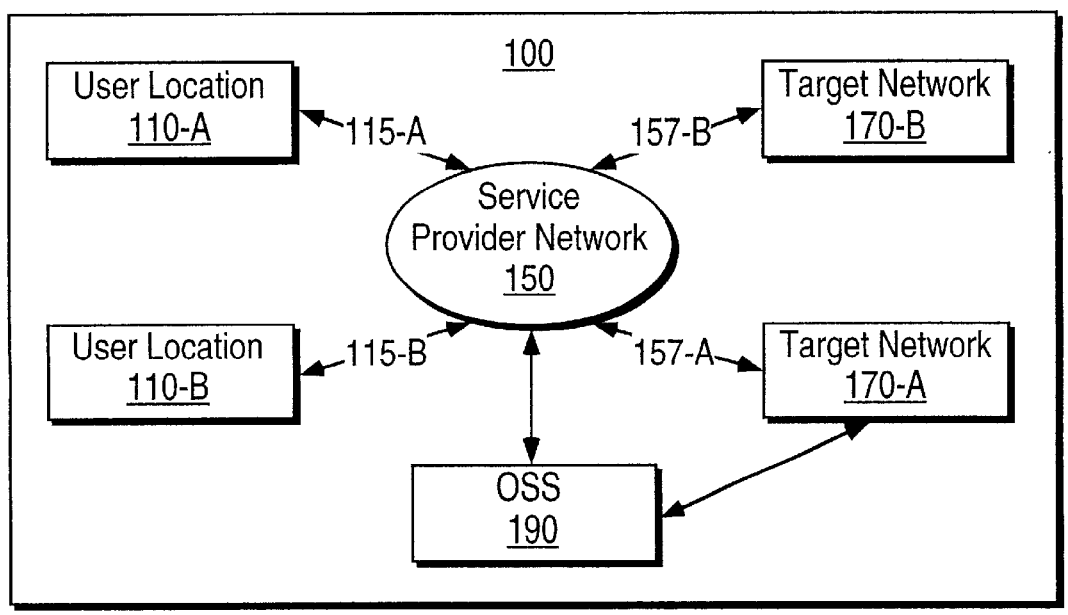
FIG. 1 is a block diagram illustrating an example environment in which the present invention can be implemented.

FIG. 1 is a block diagram of an example telecommunication system 100 in which the present invention can be implemented. For purpose of illustration, telecommunication system 100 is shown containing user locations 110-A and 110-B, service provider network 150, target networks 170-A and 170-B, and operational support system (OSS) 190. In the present description, target networks 170-A and 170-B will be collectively or individually referred to by reference numeral 170, as will be clear from the context. Similar convention is used while referring to like elements (e.g., 110 may refer to one or both of user locations 110-A and 110-B).

Each target network 170 may contain several systems (e.g., computer systems, PBX systems) and is typically owned and operated by an organization such as a corporation, an internet service provider (ISP) or content provider (e.g., Disney, Healtheon-WebMD). Only two target networks 170-A and 170-B, and two user locations 110 are shown for conciseness. In reality, telecommunication system 100 typically includes many target networks and user locations. Links 157-A and 157-B represent high bandwidth connections between service provider network 150 and target locations 170.

In the example environment described herein, service provider network 150 will be assumed to be related to a local exchange carrier providing high bandwidth connections on local loops 115 to respective homes, generally using the digital subscriber loop (DSL) technology well known in the relevant arts. As is well known in the relevant arts, DSL based service provider networks generally provide dedicated connections (usually using permanent virtual connections) from each user location to desired target network. The service provider in such situations is generally termed as either an incumbent local exchange carrier (ILEC) or a competitive local exchange carrier (CLEC) as is well known in the relevant arts.

In the present application, a party requesting a service from the service provider will be referred to as a requester. At least in the case of ILECs and CLECs, organizations such as employers and ISPs request high bandwidth connections for end-users at user locations 110-A and 110-B. For purpose of illustration, target location 170-A will be assumed to be related to an organization, and target location 170-B relates to an ISP. In such a case, the organization will be referred to as a requester. On the other hand, if a end-user requests the service, the end-user may be termed as a requester.

OSS 190 enables a service provider to coordinate different tasks to enable the service provider to provide efficient services. OSS 190 may be implemented as one or more processing machines, with the communication necessary for providing the features of the present invention. A processing machine in turn can be a general purpose data processing system (e.g., network computer, personal computer, etc.) or a special purpose machine (e.g, one specifically designed for configuring or testing a component of service provider network 150). The manner in which OSS 190 enables efficient provision of high bandwidth connections is described below.

III. Expanding Service Coverage Area

One scenario in which OSS 190 may be useful is when a LEC (CLEC or ELEC) expands the service coverage area. Expanding the service coverage area generally requires that several regulatory, design, installation, and operations related tasks to be coordinated. ILECs and CLECs share some challenges, while some other challenges are specific to each. The challenges associated with expansion of service coverage may be appreciated well with a general understanding of an example view of service provider network 150.

III. A. Service Provider Network

Figure 2:
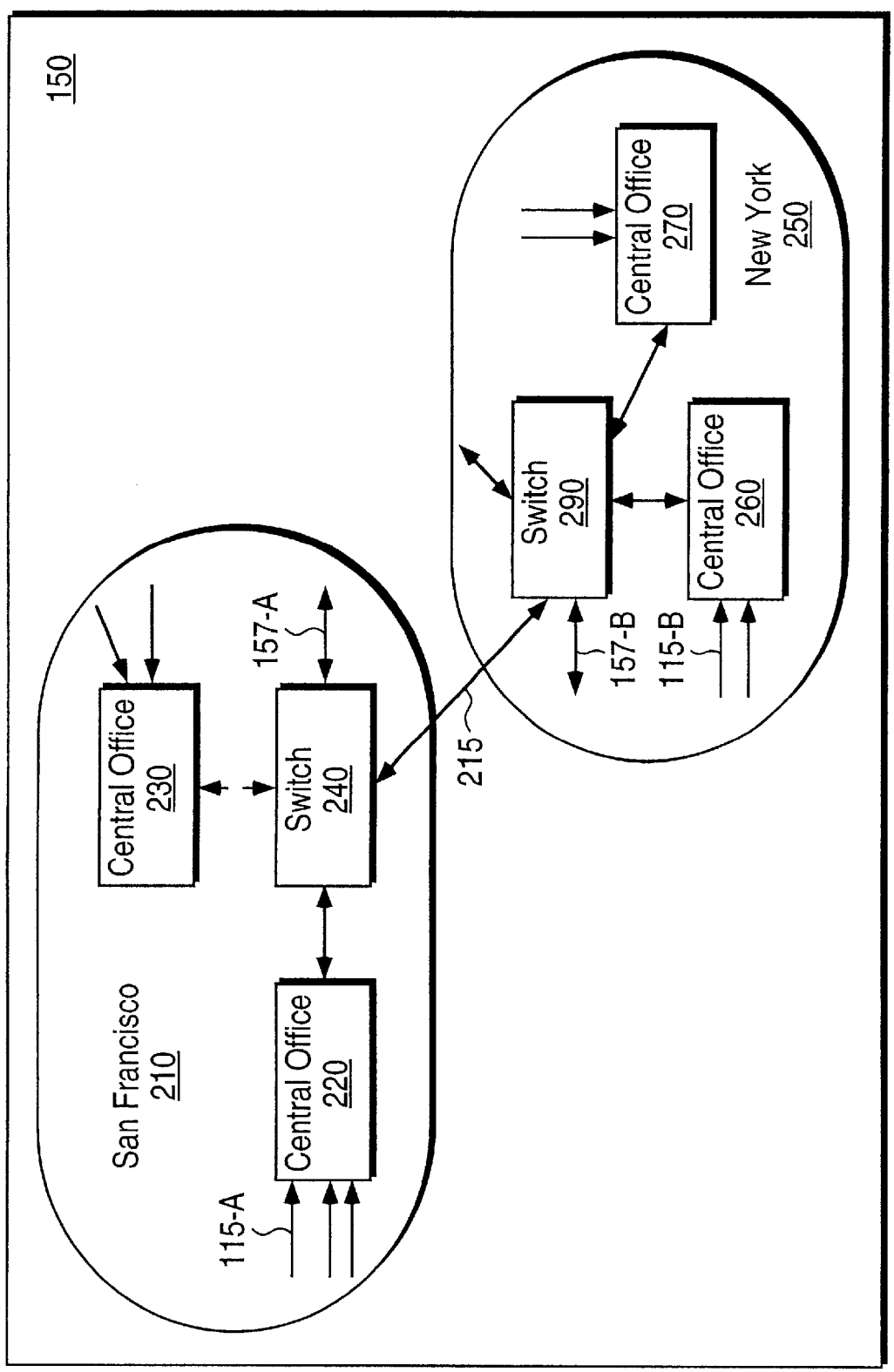
FIG. 2 is a block diagram of an embodiment of a service provider network illustrating a context in which the present invention can be used.

FIG. 2 is a block diagram illustrating a view of service provider network 150 spanning several geographical areas. The description here is provided with respect to CLECs at several points. However, several aspects of the present invention may be practiced by an ILEC also. Also, for illustration, area 210 may represent San Francisco, and area 250 may represent New York. Each city typically has many central offices, with each central office serving a small neighborhood. A central office generally refers to a location (building) which has an end of local loops connecting to user locations.

Thus, area 210 is shown including central offices 220 and 230, and area 250 is shown including central offices 260 and 270. Central office 220 in San Francisco is shown connected to local loop 115-A and central office 115-B is shown connected to local loop 115-B. Each central office is typically connected to thousands of local loops, even though only a few are shown in the Figures for conciseness. In addition, each user location is generally connected to only one central office, but potentially with several local loops.

Each of the central offices 220,230, and 260 is commonly owned by an ILEC. When a CLEC wishes to provide high bandwidth connections on local loops, the CLEC secures unbundled local loops from the ILEC pursuant to regulatory requirements prevalent in United States, and provides high bandwidth connections to user locations connected to the local loops.

User locations connecting to the central office generally require connectivity to other user locations connecting to different central offices. The connectivity may be required with user locations in other cities as well. To provide such connectivity, a CLEC generally includes equipment in each central office. Examples of such equipment are described in further detail with reference to FIG. 3 below.

Switches (e.g., an ATM/Frame Relay, or internet protocol router) are also typically used to provide the connectivity between user locations. Switch 240 in area 210 and switch 290 in area 250 are examples of such switches even though an area generally contains more switches. Even though switches are shown outside of central offices, it should be understood that they can be placed within a central office. Link 215 may provide high bandwidth connectivity between the areas 210 and 250.

Figure 3:
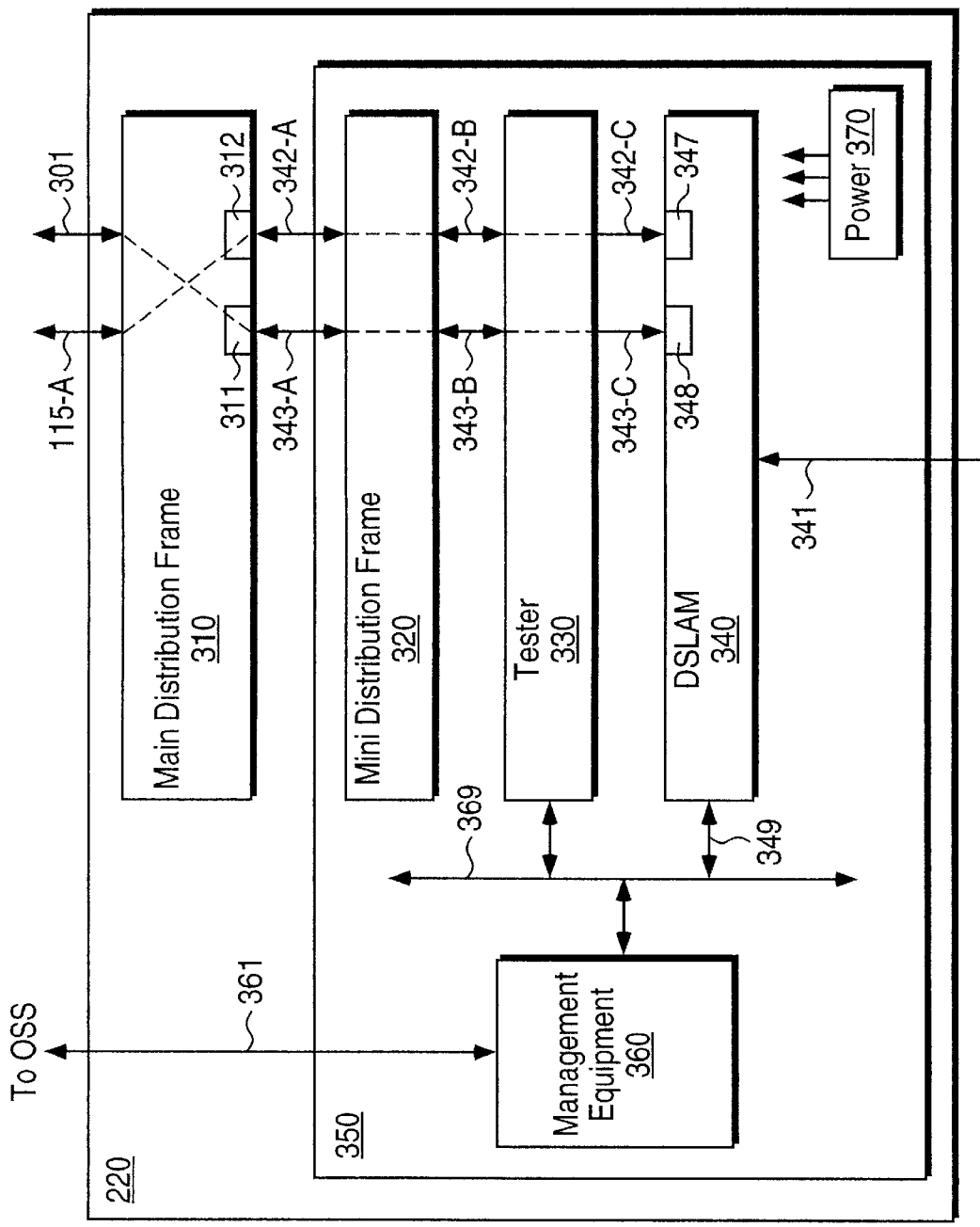
FIG. 3 is a block diagram of a central office illustrating the typical equipment installation requirements and regulatory considerations.

Thus, when a CLEC wishes to expand service coverage area (i.e., provide service to user locations connected to a new central office), the CLEC generally needs to perform several tasks, both regulatory and equipment implementation related. The overall process may be termed as 'rolling out' service in the new central office. For purpose of illustration, central office 230 (shown as being connected with dotted lines) will be assumed to be such a central office. FIG. 3 further illustrates the regulatory environment and the equipment requirements in a central office in an example scenario.

III. B. Central Office

FIG. 3 is a block diagram of central office 220 illustrating the regulatory and equipment requirements in an example scenario. Colocation space 350 refers to space within a central office, which ILECs are required to provide to a CLEC. Colocation space is some times separated by cages to provide for clear delineation between the space provided to a CLEC and the rest of the central office. Colocation space 350 may contain mini distribution frame 320, tester 330, DSLAM 340, management equipment 360 and power 370 in the example situation of here.

An ILEC typically provides main distribution frame 310, which receives the local loops connecting to user locations. Main distribution frame 310 contains the cross-connects to connect the local loops to a required port (311 or 312) on main distribution port 310 of an ILEC. There may exists a one to one mapping between the ports 311 and 312 of main distribution frame, and the ports (not shown) of mini distribution frame 320 of a CLEC. The ports on mini-distribution frame 320 may in turn have a one-to-one relationship ports (347 and 348) on DSLAM 340.

The CLEC generally decides the port (348 or 347) on DSLAM 340 (and thus on a specific port on the main distribution frame 310) on which to receive the connection to a local loop. Thus, the CLEC may request that local loops 115-A and 301 be provided on ports 311 and 312 of main distribution frame respectively. The ILEC in turn provides the cross-connects to provide the requested connections as depicted in FIG. 3.

Tester 330 maybe used to check the electrical characteristics of a local loop secured from a ILEC. Such testing may be required, for example, to ensure that the loop has been connected by the appropriate cross-connect and to determine whether a local loop can support higher bandwidth connections using technologies such as ADSL and SDSL.

Port 347 of DSLAM 340 may be connected to local loop 301 through links 342-A, 342-B and 342-C, and port 312. Port 348 may be connected to local loop 301 through links 343-A, 343-B and 343-C, and port 311. In an embodiment, each port of DSLAM 340 may be capable of supporting only one or a subset of the types of xDSL technologies. For example, one port may be capable of supporting IDSL and another port may be capable of supporting ADSL.

Management equipment 360 may be used to control the other components in colocation space 350. In one embodiment, management equipment 360 may be implemented as an internet protocol (IP) router, which receives commands using IP protocol, and forwards the commands to tester 330 and DSLAM 340 on local area network 369. Tester 330 and DSLAM 340 may be designed to respond to the received commands.

Power 370 provides electrical power to some or all of the components in colocation space 350. It should be noted that the components described are merely examples of the equipment which a CLEC may need to install in a central office. Many times, installation requires coordination of several tasks from several different parties. In addition to the installation, a CLEC may need to deal with regulatory aspects in acquiring colocation space.

Such numerous tasks may present management challenges to a CLEC while establishing presence in a central office. The execution of the tasks may be complicated as the actions of several people, both employees and non-employees of the CLEC, may need to be coordinated. The problems may be exacerbated as the CLEC may need to establish presence in many central offices in parallel while rolling out service to cover a broad geographic area.

The manner in which OSS 190 addresses some of the problems is described below in further detail. First some example tasks to be performed are described. Then, the manner in which OSS 190 facilitates the reliable and efficient implementation of these tasks is described.

III. C. Method of Rolling Out Service in a Area Covered by a New Central Office

Figure 4:
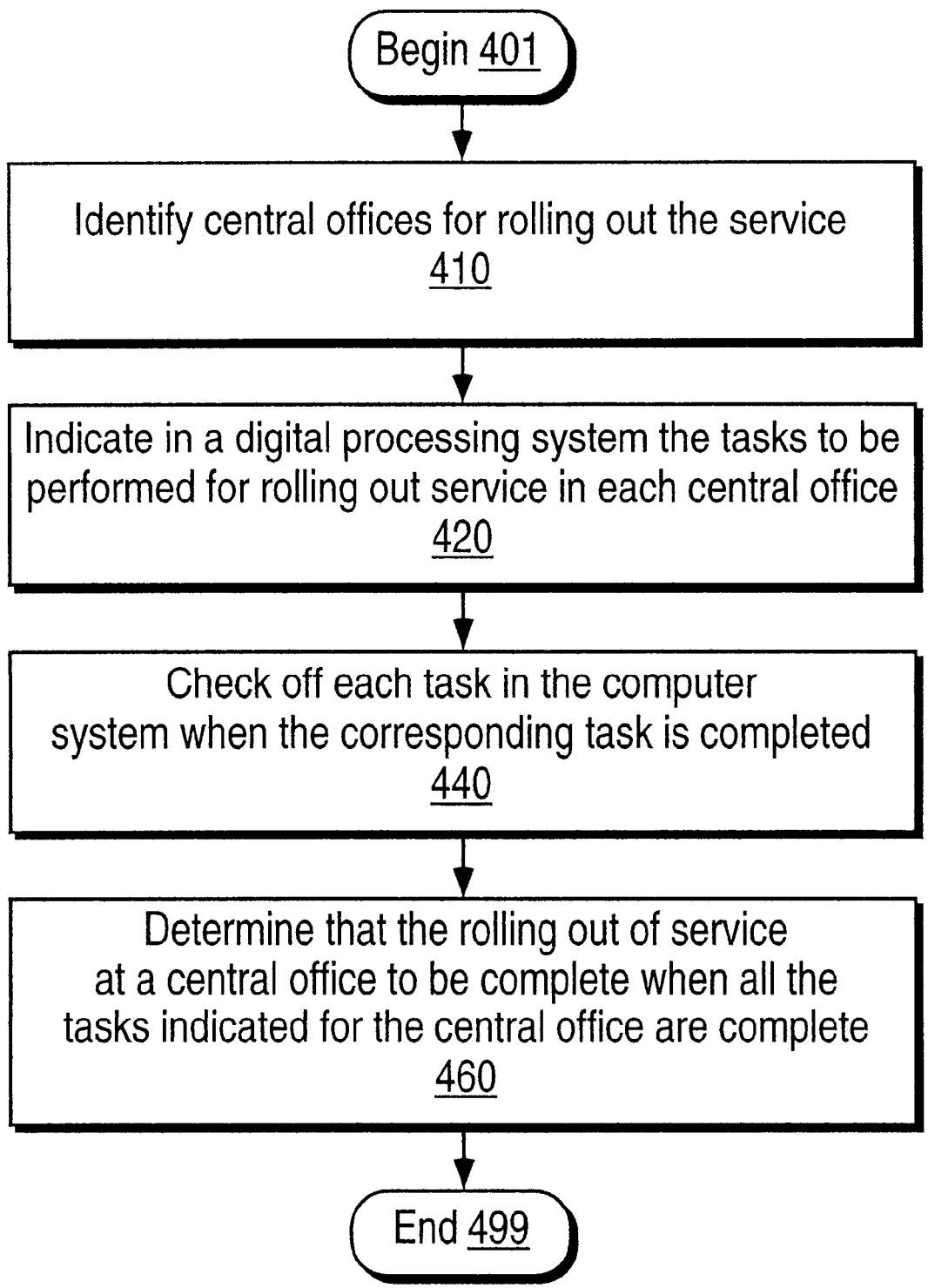
FIG. 4 is a flow-chart illustrating a method according to the present invention.

FIG. 4 is a flow-chart illustrating a method in accordance with the present invention. The method begins in step 401 and control passes to step 410. In step 410, a CLEC identifies the central offices in which to rollout the service. In step 420, the tasks required for completing the rolling out process are indicated in a digital processing unit (e.g., computer system). In an embodiment, in addition to merely including a checklist of the tasks, the dependencies may also be implemented. Dependencies are generally present when a set of earlier tasks need to be performed prior to a set of later tasks. In some cases, the later tasks are scheduled for performance upon completion of the earlier tasks in case of a dependency. In some other cases, the later tasks can be indicated to be complete only upon the completion of the earlier tasks.

In step 440, a user checks off (i.e., indicates as being completed) the tasks in the computer system upon completion of the corresponding tasks. Typically, the dependencies may be enforced while allowing the user to check off the tasks. Some examples of dependencies are described with reference to FIG. 6. In step 460, the rolling out process for a central office is determined to be complete upon the checking off of all the tasks related to the central office.

As should be readily appreciated, by using a computer system assisted process, the present invention enables a CLEC to properly monitor the rolling out process. In addition, by programming the dependencies among tasks, the present invention may ensure that the tasks are executed in appropriate sequence. The manner in which the present invention can be implemented is described in further detail below.

III. D. Computer System

Figure 5:
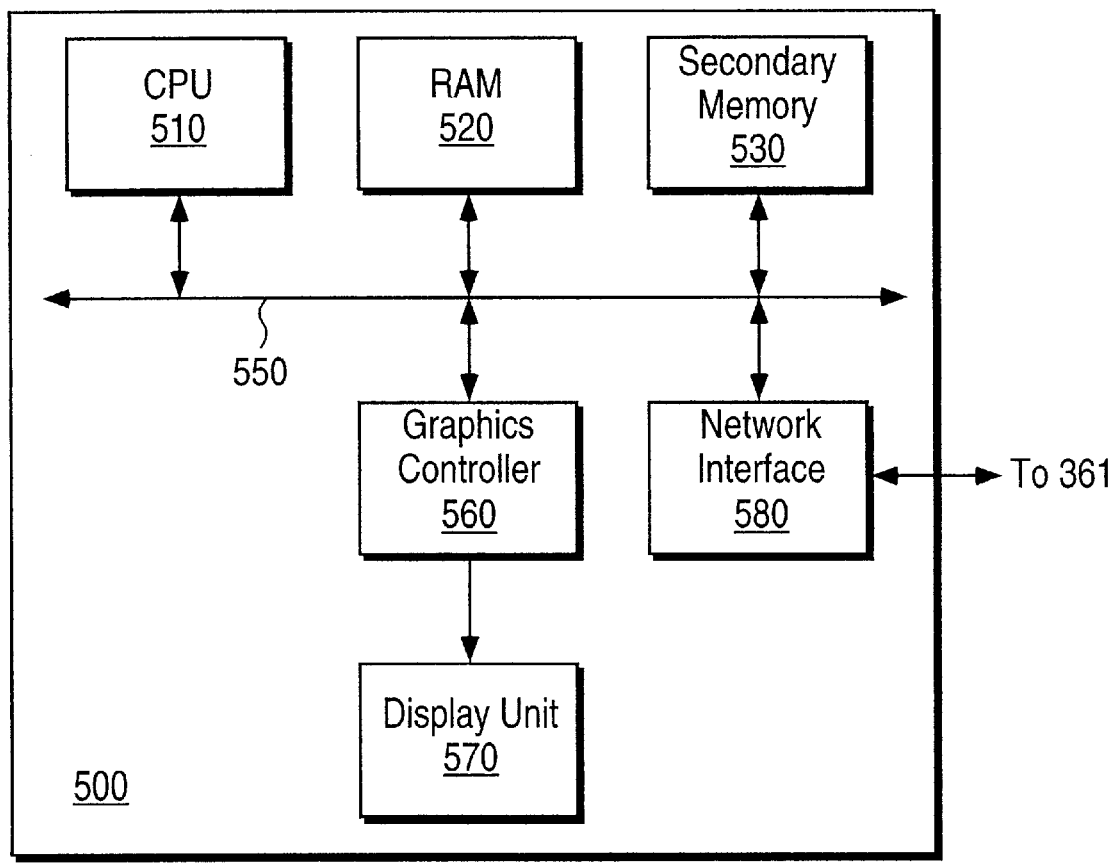
FIG. 5 is a block diagram of a computer system in which the present invention can be implemented.

In one embodiment, the present invention may be embodied in a general computer system as illustrated with reference to FIG. 5. Even though computer system 500 is described as containing a single data processing unit, it should be understood that many such data processing units may be contained in the computer system. Computer system 500 may be a part of OSS 190 of FIG. 1. Computer system 500 includes one or more processors, such as central processing unit (CPU) 510, random access memory (RAM) 520, secondary memory 530, graphics controller 560, and display unit 570. All the blocks, except display unit 570 may be connected to communication bus 550.

Network interface 580 may be used to communicate with management equipment 360 on network connection 361 in a known way. Graphics controller 560 may generate display signals for display unit 570 in a known way to enable a user to use computer system 500. Secondary memory 530 includes, for example, a hard disk drive and/or a removable storage drive, representing a floppy disk drive, a magnetic tape drive, a compact disk drive, etc. Each of these forms of secondary memory 530 may be termed as a program storage device or a computer program product.

Computer programs (also called controllers) may be implemented in accordance with the present invention, and be stored in secondary memory 530. Such computer programs are generally retrieved into RAM 520 and executed by CPU 510. When executed, the programs enable computer system 500 to perform the features of the present invention discussed herein.

In particular, the computer programs, when executed enable CPU 510 to perform the features of the present invention. Accordingly, such computer programs represent controllers of computer system 500.

Before describing such a computer program is greater detail, it is helpful to understand the typical tasks in the process of rolling out service in a central office, and some dependencies in the tasks.

III. E. Example Tasks in Establishing Presence in a Central Office

Figure 6:
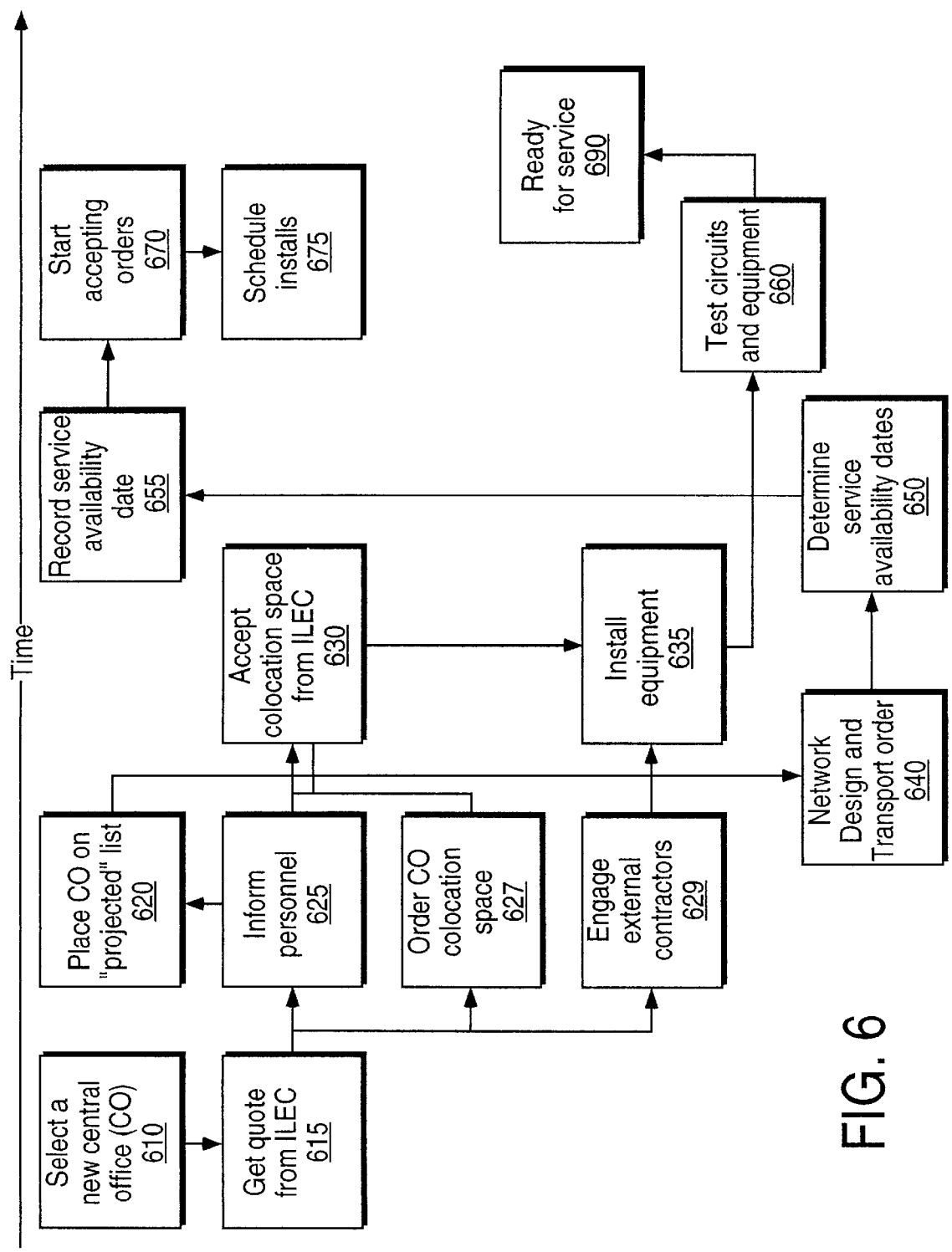
FIG. 6 is a diagram illustrating the tasks which may need to be executed and the dependencies among the tasks in rolling out service in an area covered by a new central office.

FIG. 6 is a diagram illustrating the tasks which may need to be performed to rollout service in a central office. The tasks are shown as a function of time. The arrows indicate the typical dependency of tasks, that is, the tasks at the tail of the arrow may need to be executed only after the task at the head of the arrow. If multiple tasks (e.g., 620, 625, 627, and 629) are shown in the same time duration, the tasks can be executed in parallel.

The process may begin in task 610, in which a new central office (CO) is selected for colocation. The central office is generally selected to provide high bandwidth connections to user locations connected by local loops (to the selected central office). In task 615, the CLEC may get a (price) quote from the ILEC for colocation space in the selected central office. The ILEC may provide an estimate of when the colocation space will be available for the CLEC. The availability of the quote triggers three tasks, 625, 627 and 629.

In task 625, the marketing and operations groups may be notified of the intent to add a new central office to service provider network 150. A list of electronic mail addresses may be maintained and an electronic mail may be used to automatically send a mail notification. In task 627, an order for the colocation space may be placed by one of the notified personnel or group. In task 629, external contractors may be engaged to install equipment in the central office. Typically, the contractors may install equipment such as power supplies, wiring, DSLAMs, etc., as is well known in the relevant arts.

In task 620, the list of projected central offices (in the process of being rolled out) in computer system 500 may be updated to reflect the new addition. In task 640, the design group may design the network to determine the hardware and transmission lines (bandwidth) required to add the central office. The necessary orders may be placed. In task 650, the service availability dates may be determined based on the information provided by vendors receiving the orders. For example, when transmission lines are ordered, a transmission company vendor may provide a 'firm order commit' (FOC) date indicating when the ordered line will be ready. Based on such information, the service availability date may be determined. In addition, the overall progress of any other tasks may be used to determine whether the expected date of service availability can in fact be met.

Once the service availability date is determined, the date may be recorded in task 655, and orders for connections to user locations in the area served by the new central office may be accepted. Orders may be taken in advance of actual availability once the service availability date is determined. Often a CLEC may have the responsibility to perform installations at the user locations, and such installations may be scheduled in task 675.

In task 630, the CLEC may access the colocation space from the ILEC. The necessary equipment may be installed in task 635. The circuits and equipment used for providing high bandwidth connections are tested in task 660. Testing may be performed in a known way. The new central office is ready for providing high bandwidth connections once testing is complete. It may be desirable that the central office be ready before the actual installations to enable the installers to test connections end-to-end (from user locations to respective target networks).

The tasks of FIG. 6 can be coordinated by a software program implemented in computer system 500 as noted above. The operation and implementation of the program can be understood best by considering some of the information maintained and the user interface as described below.

III. E. Examples of Information Maintained by OSS

Figure 7A:
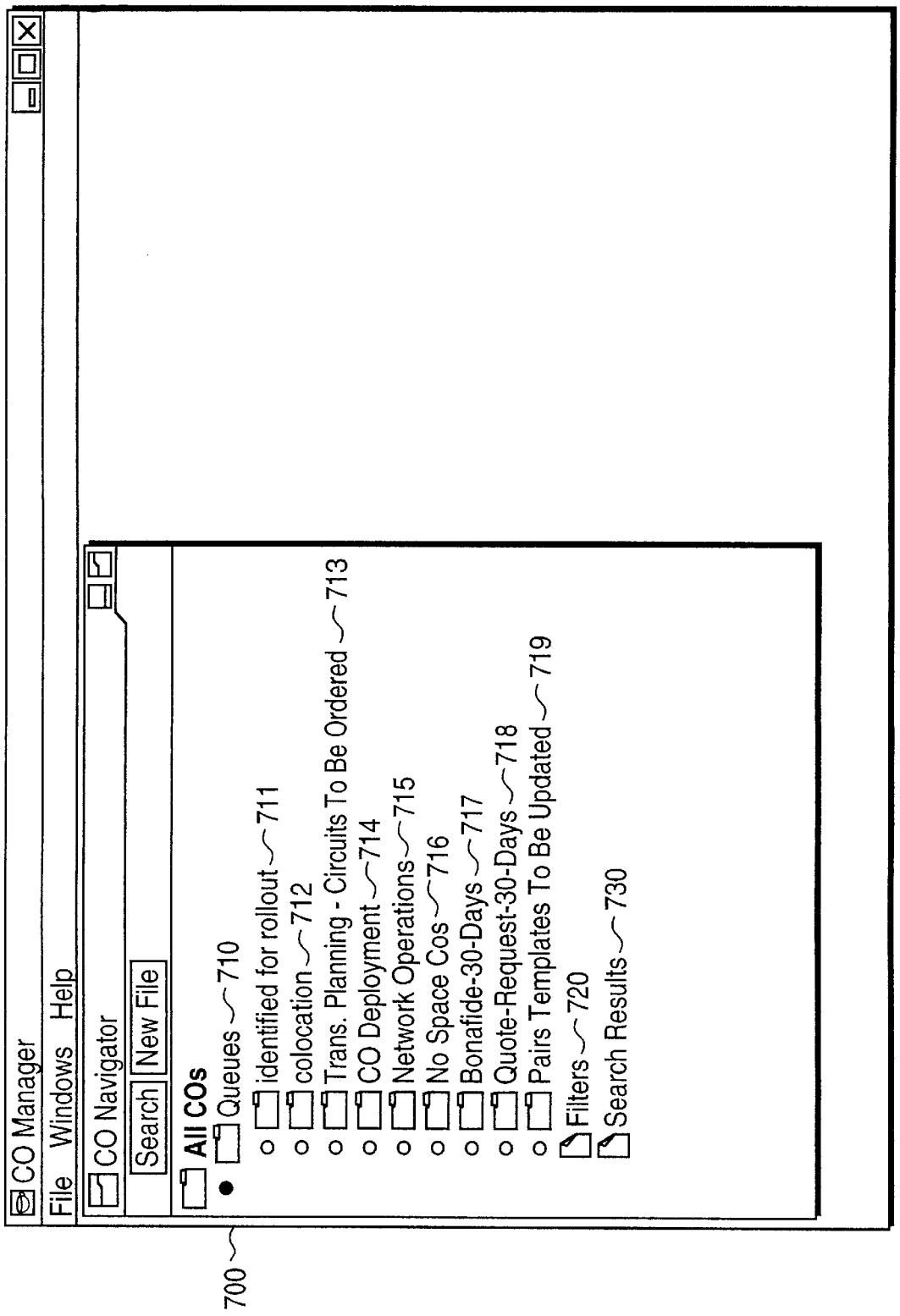
FIGS. 7A, 7B and 7C depict display screens illustrating the manner in which information for several central offices is organized in an embodiment.

FIG. 7A depicts display screen 700 illustrating the user interface and the information maintained by computer system 500 in one embodiment. It should be understood that the display screens and the user interface are merely examples. Other ways of implementing the features of the present invention will be apparent to one skilled in the relevant arts by reading the disclosure herein, and such other ways are contemplated to be within the scope and spirit of the present invention.

Continuing with reference to FIG. 7A, display screen 700 is shown with three groups (folders)—Queues 710, filters 730, and search results 740. Filters 730 enables a user to request specific information as desired by the user. The information available through filters 730 may be same information accessible by queues folder described below with reference to FIGS. 8A–8I. In general, queues 710 present information according to the typical processes followed by a LEC, while filters 730 enable custom information to be retrieved. Search results 730 is not described here as not being necessary to an understanding of the present invention.

Figure 7B:
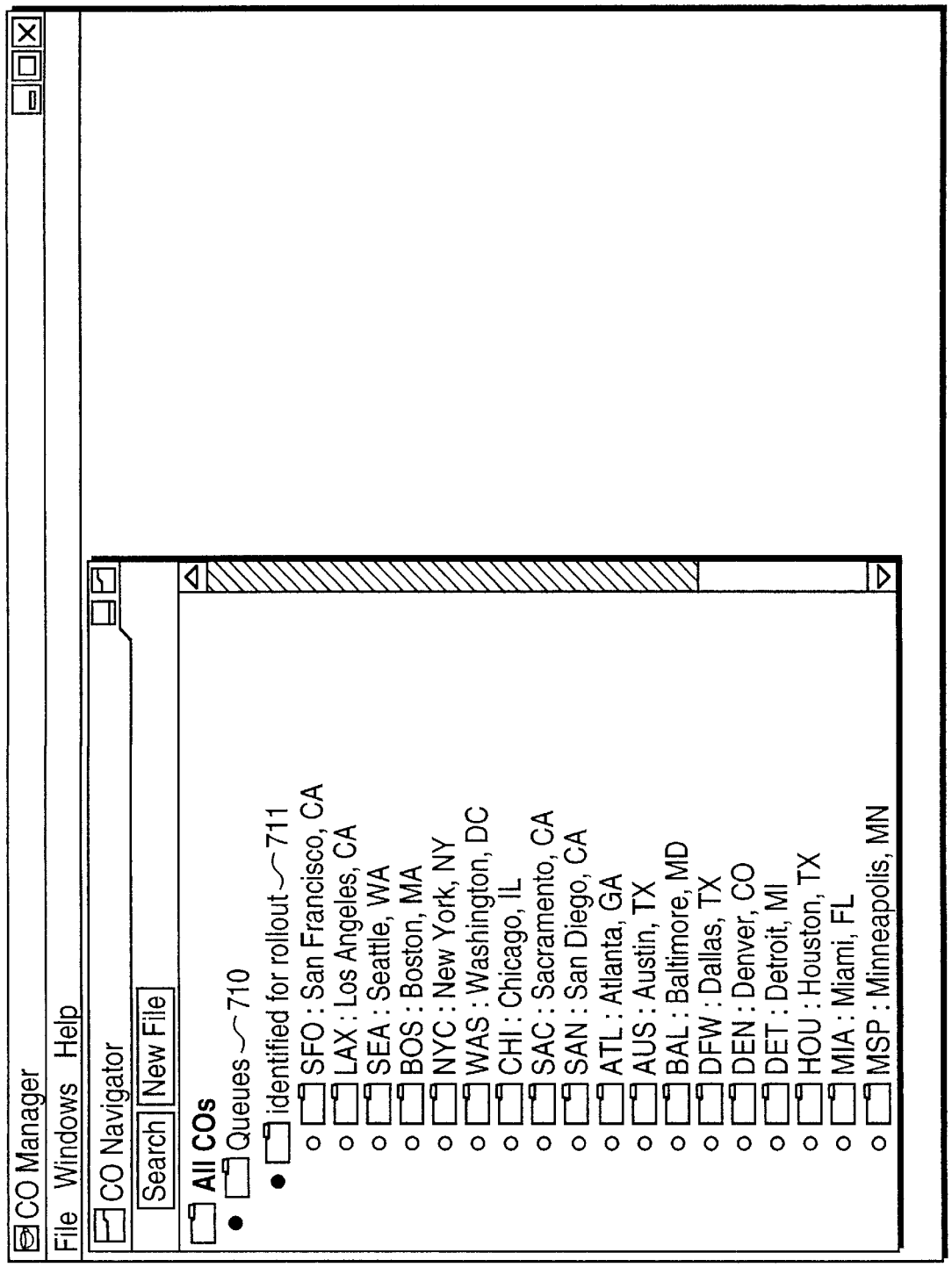
Figure 7C:
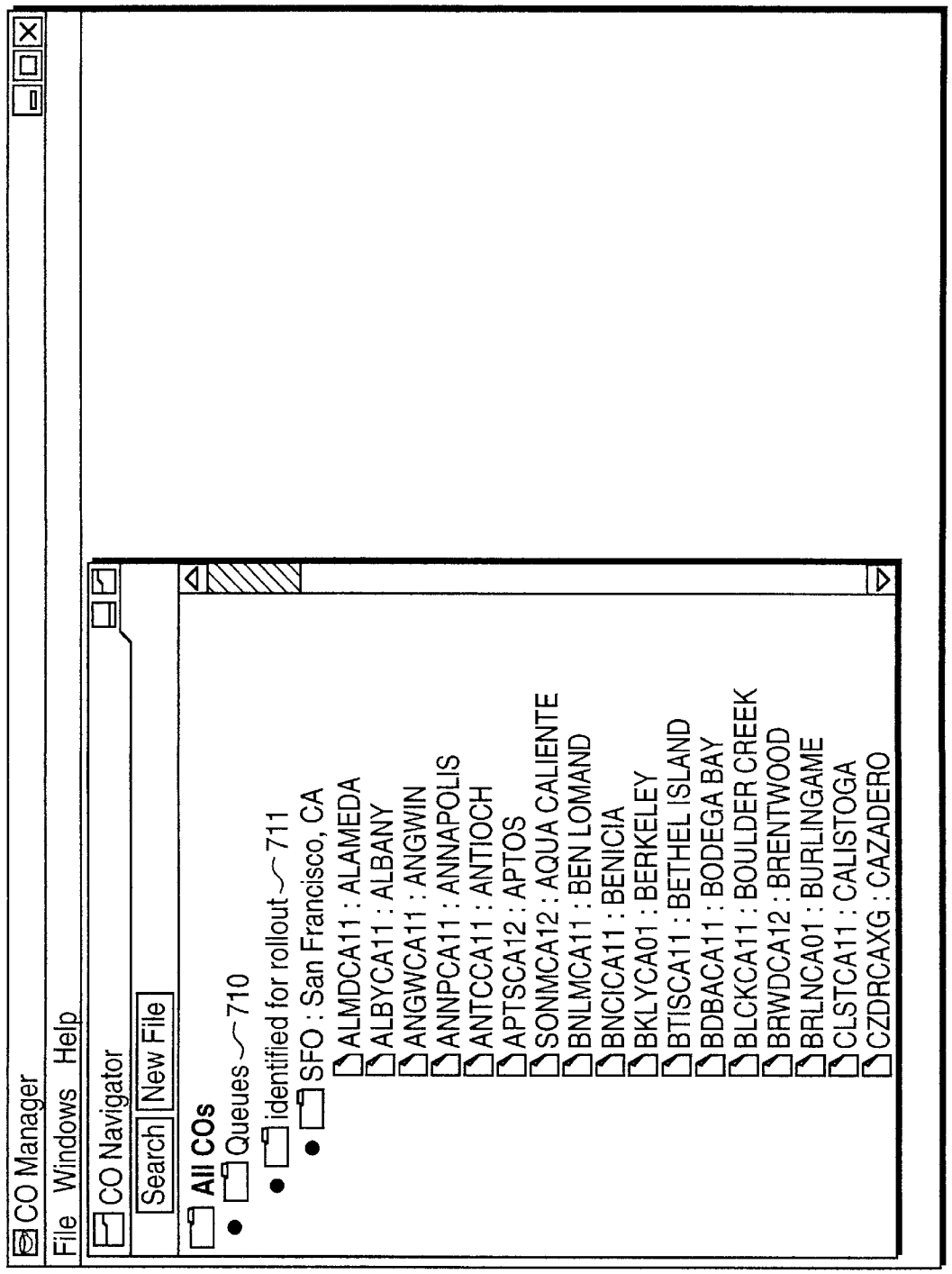

Queues folder 710 contains several individual queues indicating the status of all the central offices with respect to the status information maintained in the corresponding individual queue. For example, queue 711 entitled 'Identified for rollout' indicates all the central offices identified for rollout in task 710 as illustrated with an example in FIG. 7B. The folders in queue 711 may identify a city (area) within a state, and the user may select ('click on') the city to view all the central offices identified for rollout in that city. FIG. 7C depicts the list of central offices identified for rollout in San Francisco, Calif.

Each of the remaining queues in folder 710 enable a viewer to generate reports on the status of different central offices with respect to the information identified by the queue as described below. However, the reports are generally based on data, which can be accessed and modified by accessing each central office shown in FIG. 7C. The data may be stored in a database on secondary memory 530 of FIG. 5 in a known way. As used in the present application, a database refers to any entity implemented in hardware, software, and/or firmware which enables data to be stored and retrieved according to agreed upon interface/ convention. The data in the database may be accessed and modified by selecting each central office as described below.

Figure 8A:
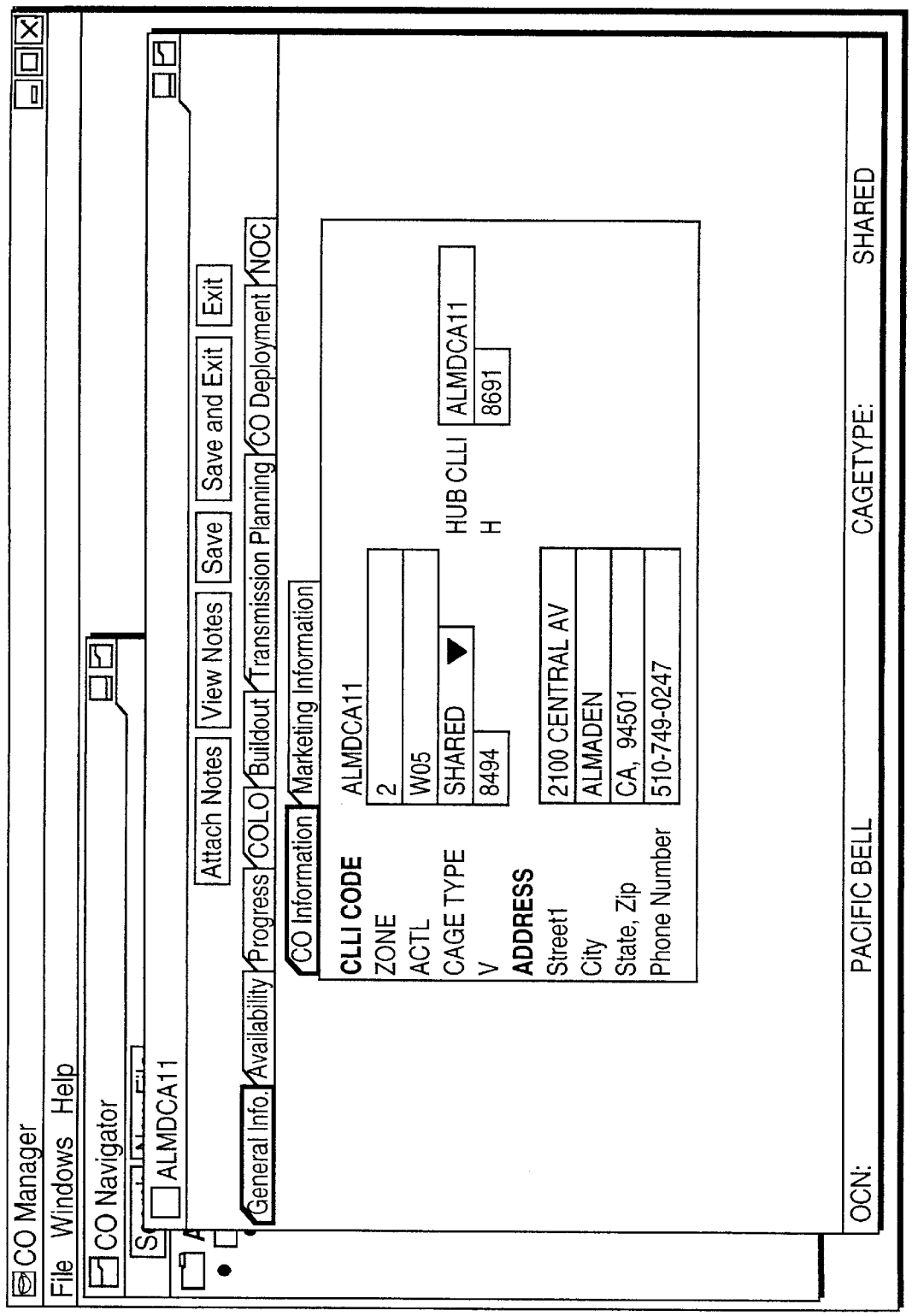
FIGS. 8A through 8I depict display screens illustrating the type of information which may be maintained in an embodiment to support the rollout of the service in a area covered by a new central office.

FIG. 8A depicts a screen which may be displayed when a central office (ALMDCA11 there) is selected in the screen of FIG. 7C. Tab entitled, 'Attach Notes' enables a viewer to add any notes for subsequent viewers. 'View notes' tab enables a viewer to view previously added notes. The notes can be organized according to individual users or groups. In general, the notes tabs may be used to indicate problems of a general/global nature with respect to a central office. Notes regarding specific problems may be generated, for example, as described with respect to the 'Progress' tab below. 'Save' tab causes the changes made by a viewer to be recorded in the database. 'Exit' tab causes the changes to be ignored and a present viewing session to terminate. 'Save and Exit' tab causes the changes to be saved and the session terminates.

FIG. 8A includes additional tabs for viewing different types of information. The 'General Info' tab shows the address of the central office. The 'CLLI Code' refers to a unique code identifying each central office, and is usually assigned by BellCore to each central office in the USA. The 'Zone' field indicates the type of area (business, residential) specified in an interconnect agreement, potentially for tariff purposes. The 'cage type' field indicates whether the cage is shared with other parties(e.g., another CLEC). However, the field may be used to indicate other means of delineation of colocation space.

The 'HUB CLLI' field indicates the CLLI code of the central office which may serve as a network hub for the present central office. In the case of the screen of FIG. 8A, the same central office is serving as the hub central office. The 'V' and 'H' fields respectively represent the vertical and horizontal geographical coordinates, which may be used for service qualification as described in sections below in further detail.'Marketing Information' field is not described here as not being necessary for an understanding of features of the present invention.

Figure 8B:
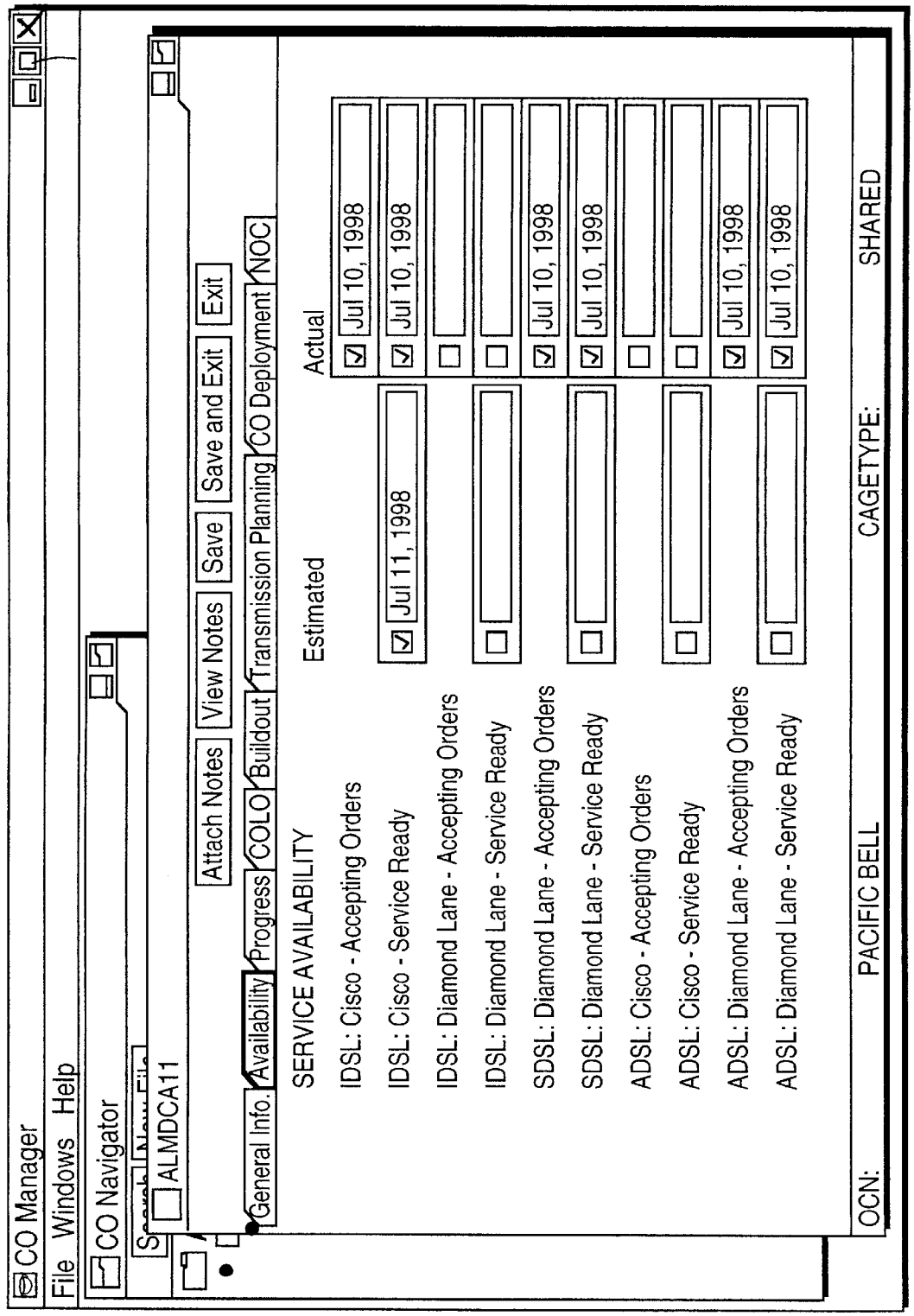

The information corresponding to 'Availability' tab is depicted in FIG. 8B. In the example environment here, it may be necessary to make specific provisions for each vendor (e.g., Cisco, Diamond Lane) and xDSL transport (IDSL, SDSL, and ADSL) combination due to, for example, limitation of product implementations.

Also, for each vendor-transport combination, three fields are shown, (1) actual accepting orders date, (2) estimated service ready date, and (3) actual service ready date. It may be noted that orders may be accepted before the service is actually ready. The estimated service date field enables the service provider to properly set the requester expectations as to the availability of the service. The actual service availability date may be set manually or automatically when other conditions are satisfied as described below. As the actual service availability date may not be modified by the viewer of the screen of FIG. 8B, the tab is shown with shaded background.

Figure 8C:
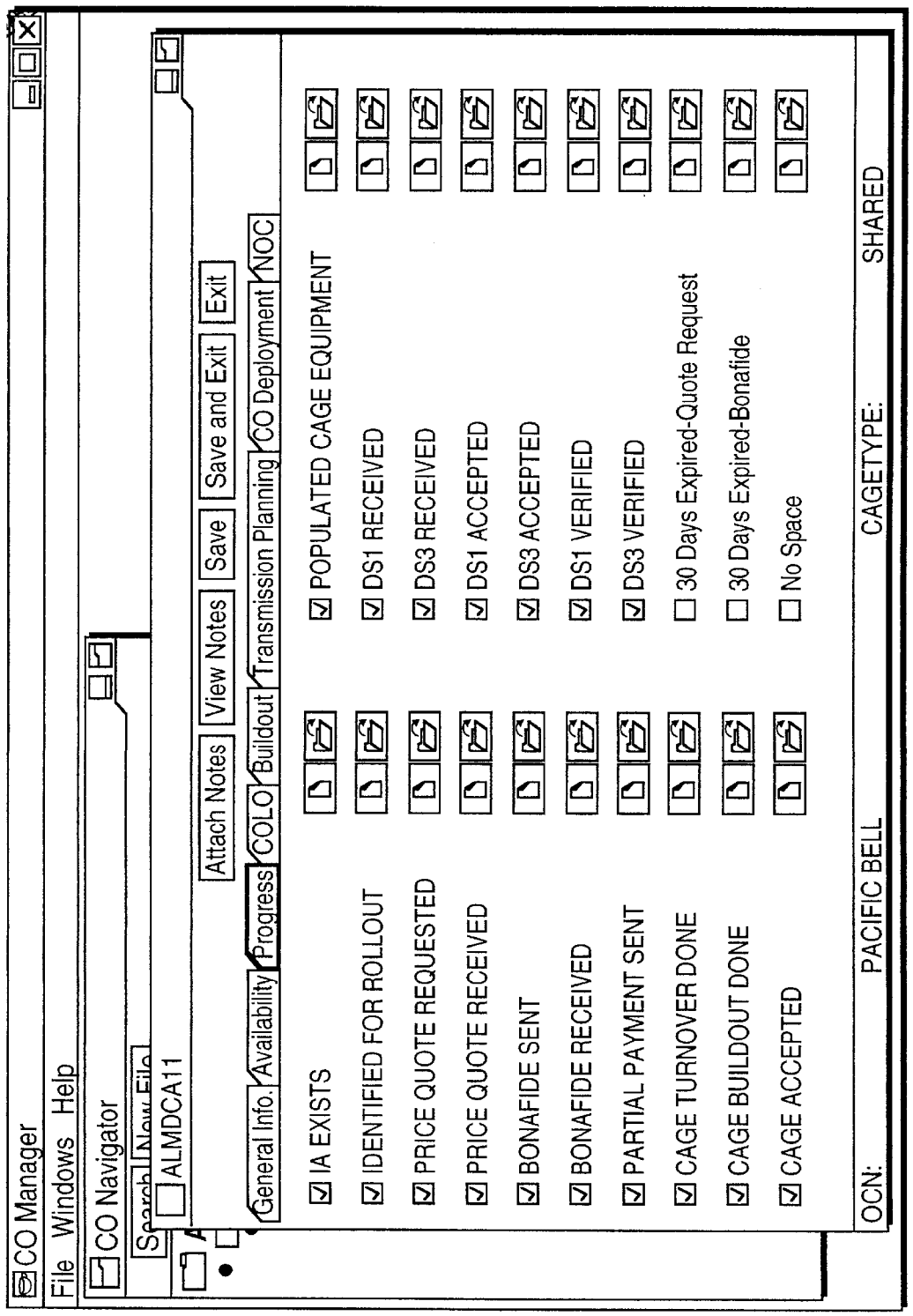

FIG. 8C depicts the display screen corresponding to the 'Progress' tab. The 'IA EXISTS' field may indicate whether an interconnect agreement exists between the CLEC and ILEC. The 'IDENTIFIED FOR ROLLOUT' field may indicate whether the central office has been selected for rolling out the service (task 610). The 'PRICE QUOTE REQUESTED' and 'PRICE QUOTE RECEIVED' fields respectively indicate whether the CLEC has requested a price quote for the colocation space and whether the price quote has been received by the CLEC.

The 'BONAFIDE SENT' field indicates whether a bonafide is sent to the ILEC. A bonafide is typically sent when an ILEC indicates whether the requested colocation space is unavailable. The 'BONAFIDE RECEIVED' field is set to indicate when the bonafide is received from the ILEC that the space is available. The 'PARTIAL PAYMENT' field indicates whether partial payment has been made by the CLEC for the colocation space.

The 'CAGE TURNOVER' field indicates whether the cage has been turned-over from the ILEC to the CLEC. As is well known in the relevant arts, a cage may be used for a clear delineation of the colocation space (of a CLEC) from the rest of the central office. The 'CAGE BUILDOUT DONE' field indicates whether a physical cage (or any other delineation scheme) is installed for a CLEC. In some states of United States of America, the cage represents a demarcation between the space allocated to a CLEC and the rest of the central office. Thus, when any required physical separation is provided, the 'CAGE BUILDOUT DONE' field is checked off.

'POPULATED CAGE EQUIPMENT' field indicates whether the necessary equipment (e.g., DSLAMs, network management equipment) is placed in the colocation space. The specific tasks required for completion of the two tasks ('CAGE BUILDOUT DONE' and 'POPULATED CAGE EQUIPMENT') are described below in further detail with reference to FIGS. 8E and 8F. The 'CAGE ACCEPTED' field indicates whether the cage has been accepted by the CLEC.

The 'DS1 Received' and 'DS3 Received' fields indicate whether the DS1 and DS3 bandwidth lines have been received. In the example environment described here, DS1 may be used for network management and DS3 may be used for transporting customer data. 'DS1 Accepted' and 'DS3 Accepted' fields indicate when the CLEC accepts delivery of the respective lines. The 'DS1 Verified' and 'DS3 Verified' fields indicate whether the operation of the lines has been verified, for example, using high layer (in OSI model) applications such as 'PING' well known in the relevant arts.

The '30 Days Expired-Quote Request' indicates whether 30 days have passed since a quote was requested from an ILEC, warranting action by CLEC personnel. The '30 Days Expired—Bonafide' indicates whether 30 days have passed since a bonafide was sent, again warranting attention of the CLEC personnel.

It should be noted that some or all of the fields may be 'populated' from entries in other forms. Population generally refers to automatic propagation (e.g., checking off the field) when the conditions precedent to a status message have occurred. FIGS. 8D—8J illustrate the population of some of the fields of FIG. 8C.

Figure 8D:
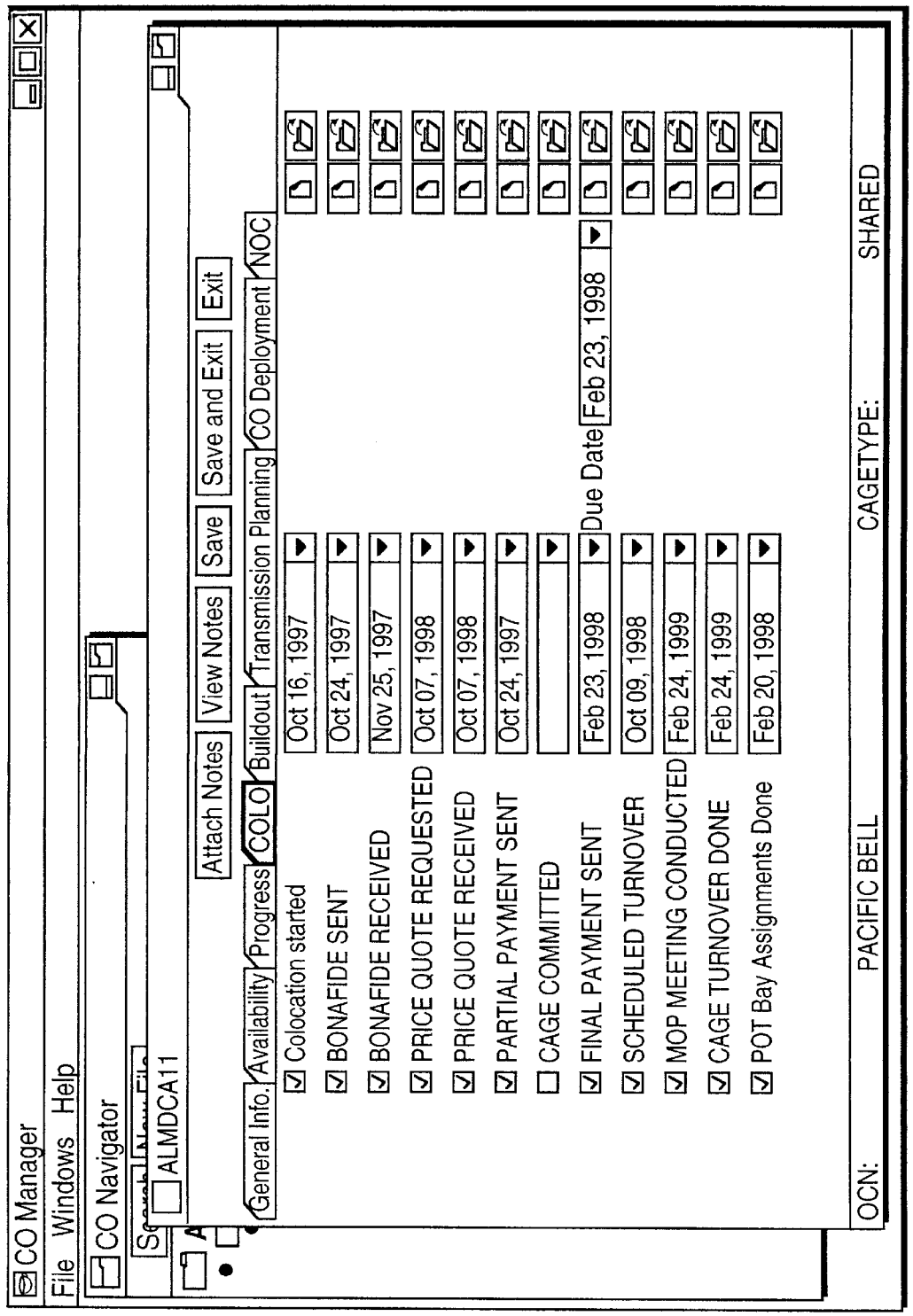

FIG. 8D illustrates the display screen corresponding to the 'COLO' (i.e., colocation tab) tab. When the 'COLOCATION STARTED' field is checked off (by ✓ symbol), the user interface may set the colocate started date to today's date automatically and enable the user to modify the date. The 'BONAFIDE SENT' field may be set by the user when the bonafide is sent to the ILEC. It should be noted that the 'BONAFIDE SENT' field of 'PROGRESS' screen of FIG. 8C is automatically set when the viewer of the screen of FIG. 8D sets the bonafide received date.

Similarly, the 'PRICE QUOTE REQUESTED', 'PRICE QUOTE RECEIVED' and 'PARTIAL PAYMENT SENT' fields of FIG. 8D are related to the corresponding fields of FIG. 8C. Even though the fields of FIG. 8C may be set automatically, a viewer with sufficient privileges may override the fields in FIG. 8C.

Continuing with reference to FIG. 8D, a user may check off the 'CAGE COMMITTED' field when an ILEC commits to provide space in the central office. The date on which the ILEC expects to provide the cages space may be indicated in the corresponding field. Checking off this field may cause OSS 190 to initiate (activate) several other forms for the central office. In other words, until an ILEC commits a cage (or otherwise agrees to provide space in a central office), a user may not be able to update such other forms (e.g., availability of service).

The 'FINAL PAYMENT SENT' field can be set to indicate whether and when the final payment has been sent. The 'Due Date' field can be set to indicate when the final payment is due. The 'SCHEDULED TURNOVER' field can be set to indicate when the ILEC expects to turnover the cage to the CLEC. Usually, a meeting (MOP Meeting) between ILEC and CLEC personnel is required for that purpose. The 'MOP MEETING CONDUCTED' field indicates whether and when a meeting between the ILEC and CLEC representatives has occurred prior to turning over the cage (or colocation space in general).

The 'POT Bay Assignment Done' field may be set to indicate whether and when the POT Bay Assignment is performed. The task generally refers to allocation of specific ports at a place where all the high speed transmission lines (e.g., line 341 of Figure) terminate. The POT bay may terminate all such lines related to all CLECs and WLEC, and specific ports are allocated for each of the parties. Thus, when such assignments are completed, the 'POT Bay Assignment Done' field may be checked off.

Figure 8E:
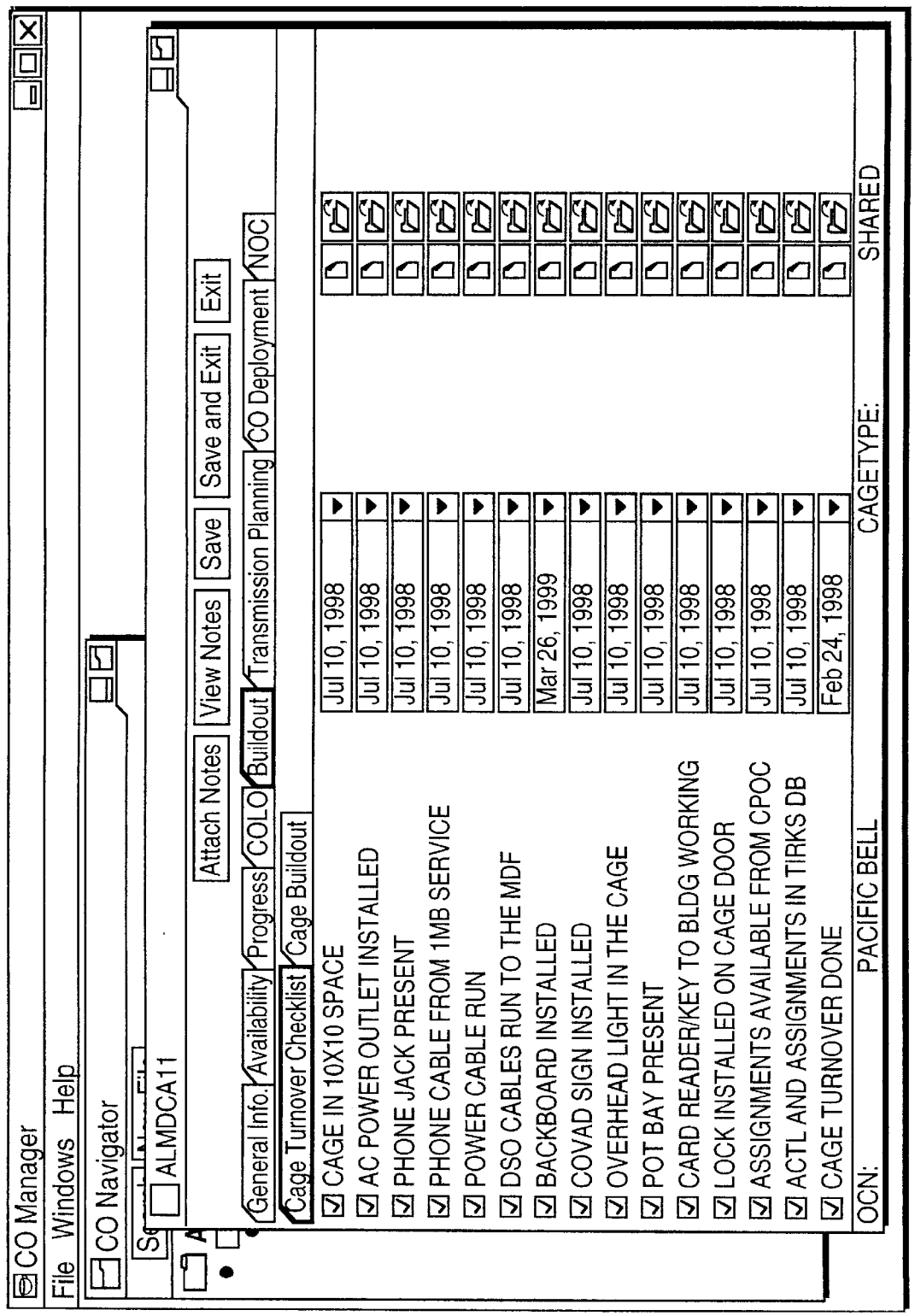
Figure 8F:
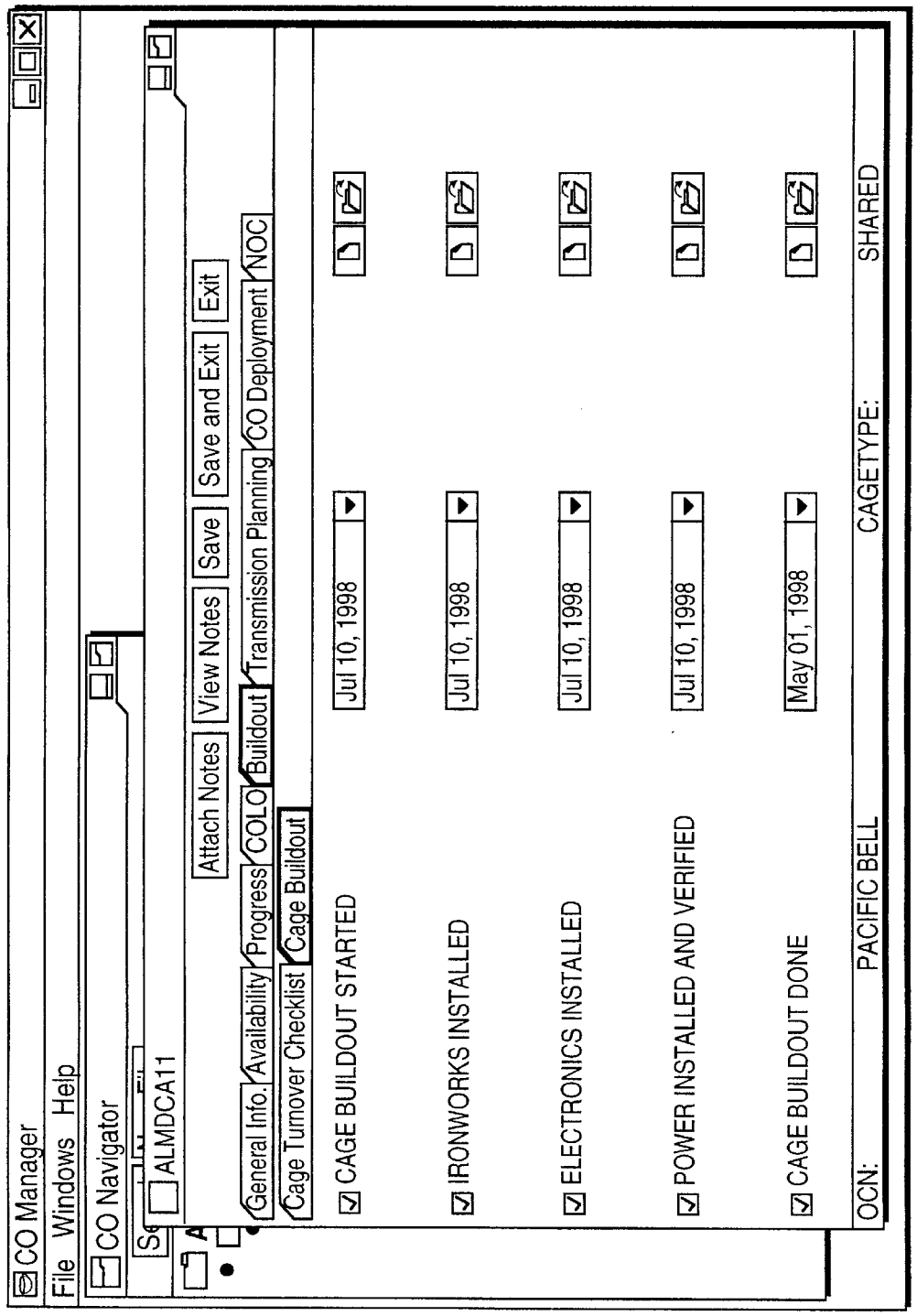

FIGS. 8E and 8F illustrate the respectively displayed screens for the 'Cage Turnover Checklist' and 'Cage Buildout Checklist', which are the two sub-tabs of the 'Buildout' tab. The 'CAGE IN 10×10 SPACE' field is set to indicate that the cage has been verified to be of 10 feet×10 feet dimensions, and the verification date may be entered. The 'AC POWER OUTLET INSTALLED' field is set to indicate whether and when the AC power outlet is installed for the colocation space. The 'PHONE JACK PRESENT' field is used to indicate whether a phone jack is present for the CLEC personnel to make any necessary telephone calls from the colocation space, and the date of such verification may also be entered.

The 'POWER CABLE RUN' field may be used to indicate whether and when a power cable is run from the AC power outlet to the equipment where equipment is expected to be situated in the central office. The 'DS0 CABLES RUN TO THE MDF' field can be used to indicate the information (when and whether) related to DS0 cables connection to the MDF 360. As noted already, the DS0 (T1) line may be used for managing the provider network.

The purpose of 'BACKBOARD INSTALLED' (backboard may serve as holder for the CLEC sign), 'COVAD SIGN INSTALLED' (indicating the identity of the CLEC), 'OVERHEAD LIGHT INSTALLED' (for visibility), 'OVERHEAD LIGHT IN THE CAGE', 'POT BAY PRESENT' (POT bay is described above), 'CARD/READER KEY TO BLDG WORKING' (for access to the colocation space), 'LOCK INSTALLED ON CAGE DOOR' (for controlling access), 'ASS1GNMENTS AVAILABLE FROM CPOC', will be clear to one skilled in the relevant arts at least based on the associated description provided in the parenthesis.

The 'ACTL AND ASS1GNMENTS IN TIRKS DB' field indicates. The 'CAGE TURNOVER DONE' field can be set to indicate whether and when the cage has been turned over to the CLEC. Once this field is marked as being done, the field entitled 'CAGE TURNOVER DONE' of FIG. 8C will also be displayed as being completed.

FIG. 8F depicts a displayed screen corresponding to the 'CAGE BUILDOUT' tab. The 'CAGE BUILDOUT STARTED' field may be updated to reflect whether and when the cage buildout process has started. The 'IRONWORKS INSTALLED' fields may be updated to reflect whether and when the iron works for the cage have been installed. The 'ELECTRONICS INSTALLED' and 'POWER INSTALLED AND VERIFIED' fields are described similarly. When the 'CAGE BUILDOUT DONE' field of FIG. 8F is updated, the field with the same label in FIG. 8C is also updated.

Figure 8G:
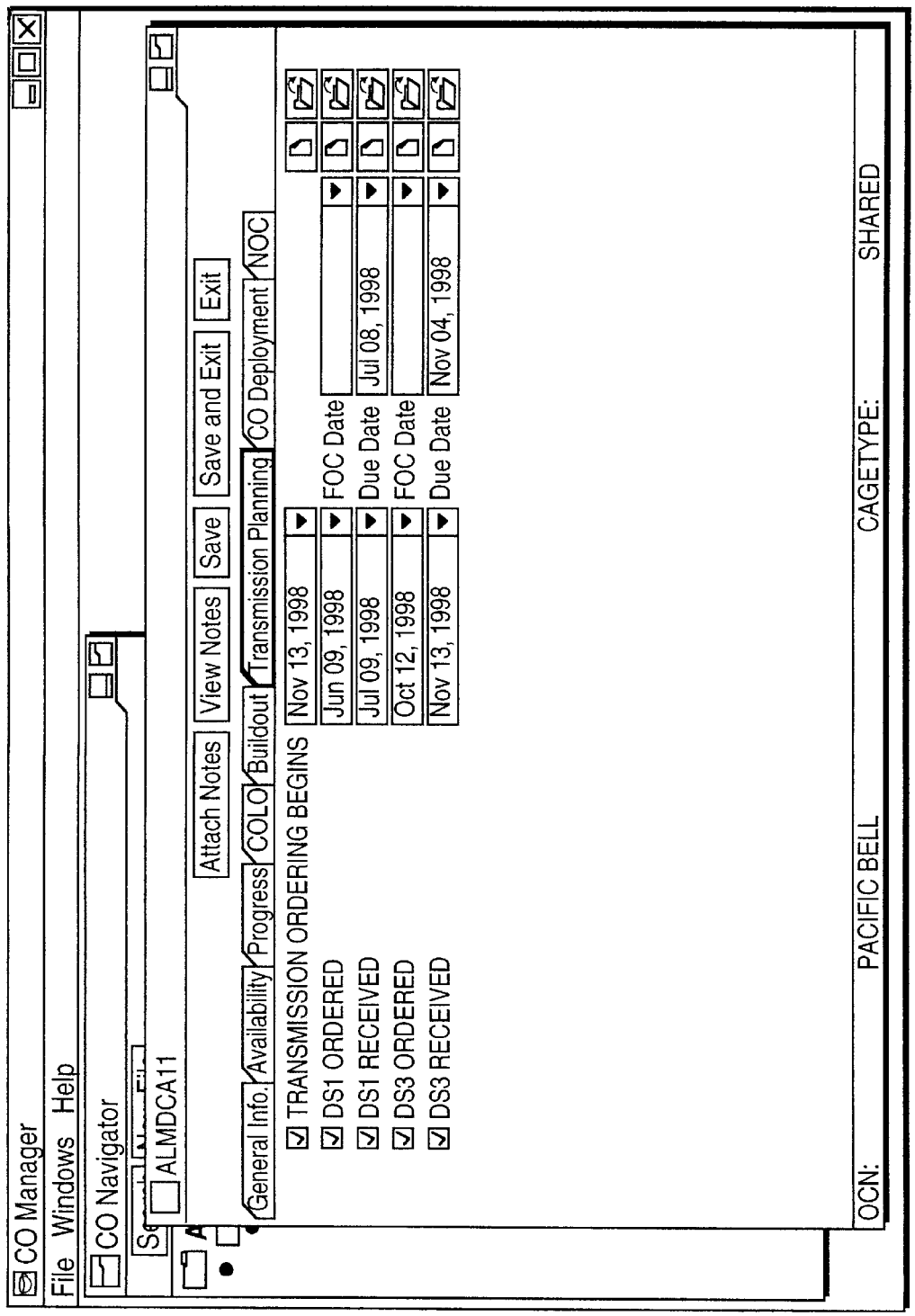

FIG. 8G depicts a displayed screen corresponding to the 'Transmission Planning' tab. The tasks associated with transmission planning and the place where respective dates can be entered are shown in the Figure. The 'TRANSMISS1ON ORDERING BEGINS' field indicates whether and when the transmission line (T1 and T3) have been ordered. The 'DS1 ORDERED', 'DS1 Received", "DS3 ORDERED', and 'DS3 RECEIVED' fields respectively indicate the status on whether and when the DS1 lines has been ordered, the DS1 line has been received, the DS3 line has been ordered, and DS3 has been received. The two received fields cause the progress screen of FIG. 8C to be automatically updated.

Figure 8H:
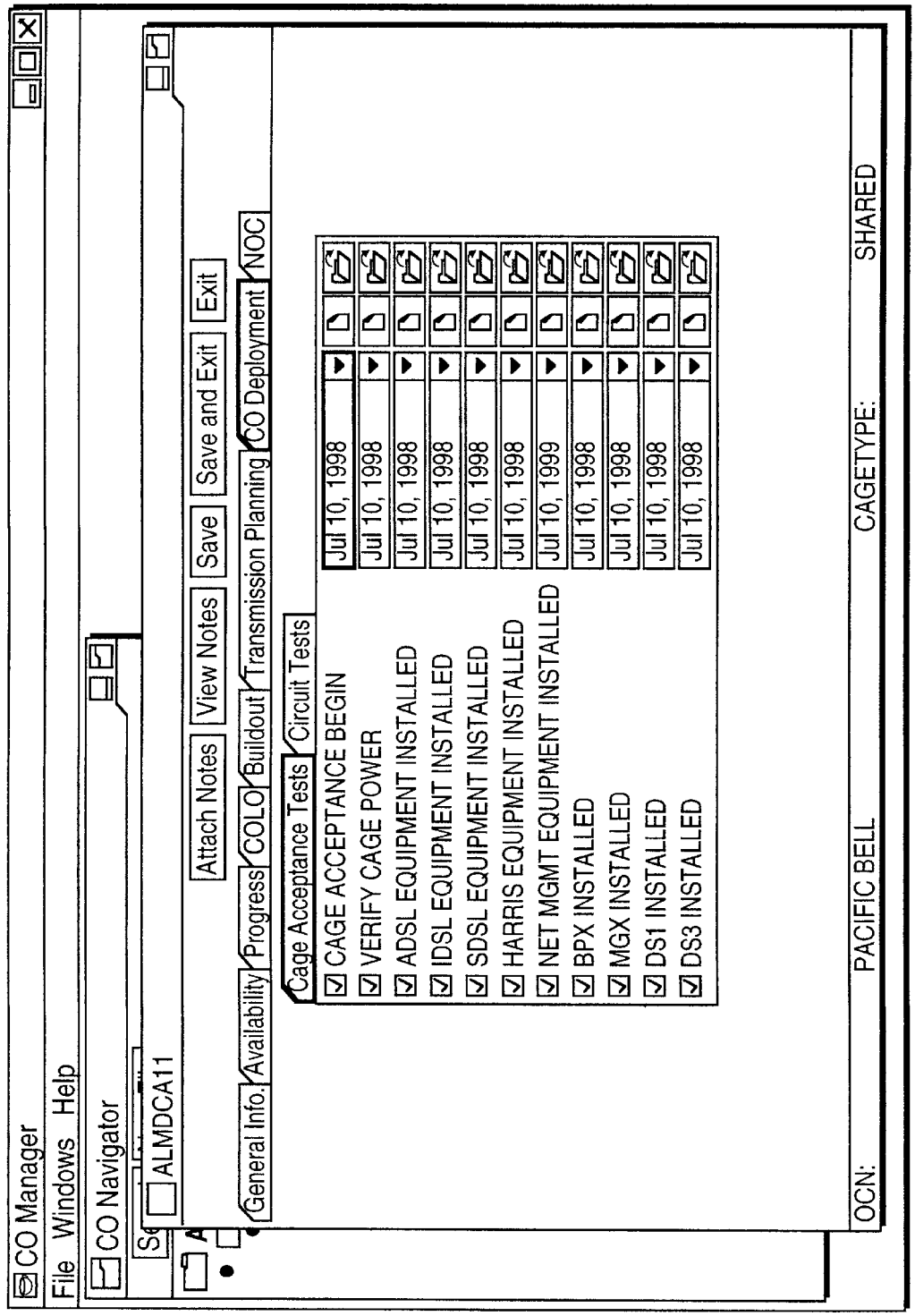
Figure 8I:
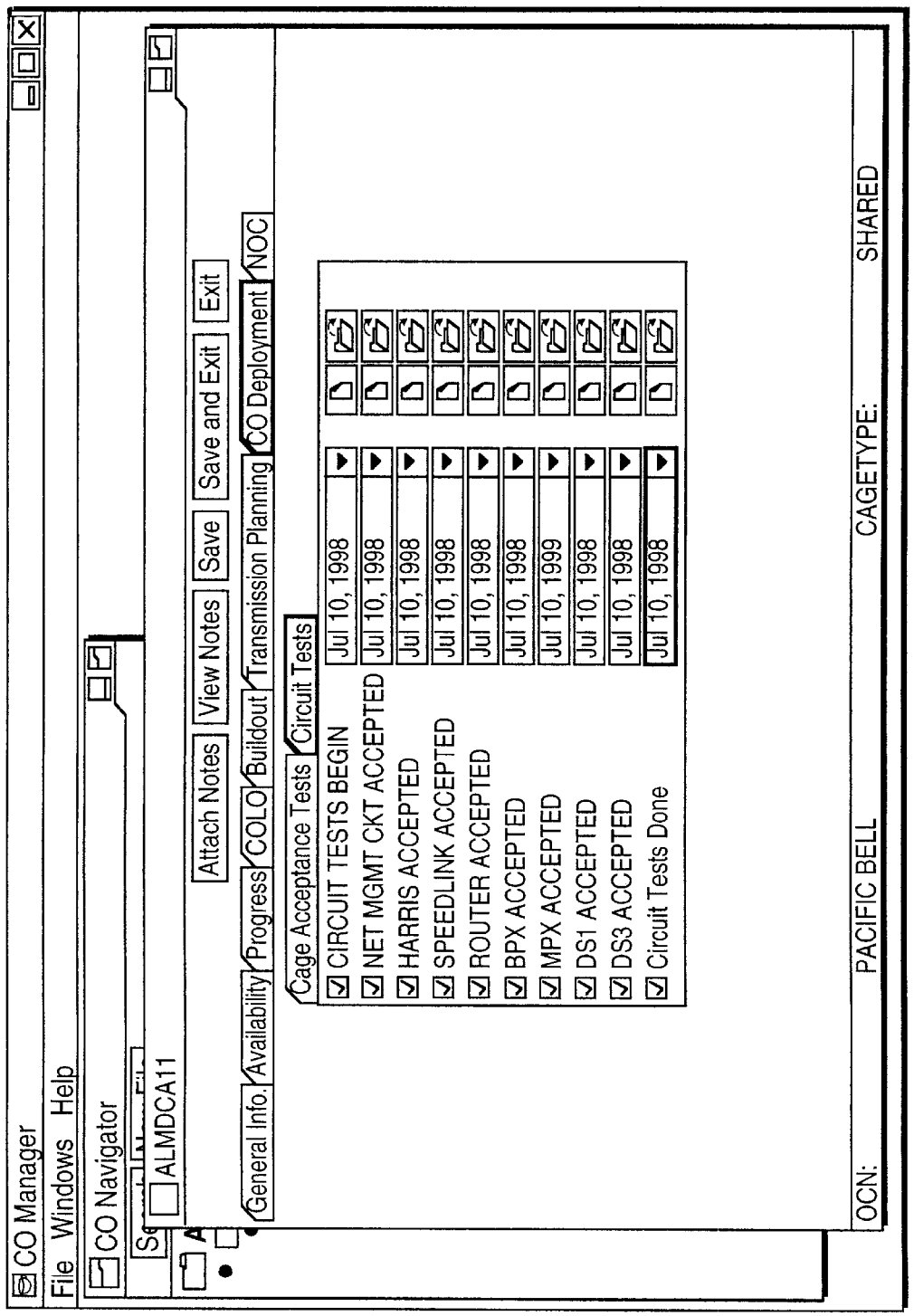

FIG. 8I depicts the displayed screen corresponding to the 'CO Deployment' tab. Two sub-tabs may be displayed—'Cage Acceptance Tests' and 'Circuit Tests'. In FIG. 8H, the screen corresponding to the 'Cage Acceptance Tests' sub-tab is depicted. The 'CAGE ACCEPTANCE BEGIN' field is used to indicate when and whether cage acceptance process has begun. The 'VERIFY CAGE POWER' field is used to indicate whether and when the electrical power to the cage has been verified.

The 'ADSL EQUIPMENT INSTALLED', 'IDSL EQUIPMENT INSTALLED', 'SDSL EQUIPMENT INSTALLED', 'HARRIS EQUIPMENT INSTALLED', 'NET MGMT EQUIPMENT INSTALLED', and 'BPX INSTALLED' fields are used to respectively indicate whether and when the ADSL equipment (e.g., DSLAMs), IDSL equipment, SDSL equipment, Harris equipment (for testing the electrical characteristics of local loops to user locations as is well known in the relevant arts), equipment for managing the network (e.g., LAN 369 and router 360) have been installed.

The 'DS1 INSTALLED' and 'DS3 INSTALLED' fields respectively indicate whether and when the installation of the DS1 and DS3 lines are complete. The 'Circuit Tests Done' field is used to indicate whether and when the basic transmission testing of the DS1 and DS3 lines is complete.

Figure 8J:
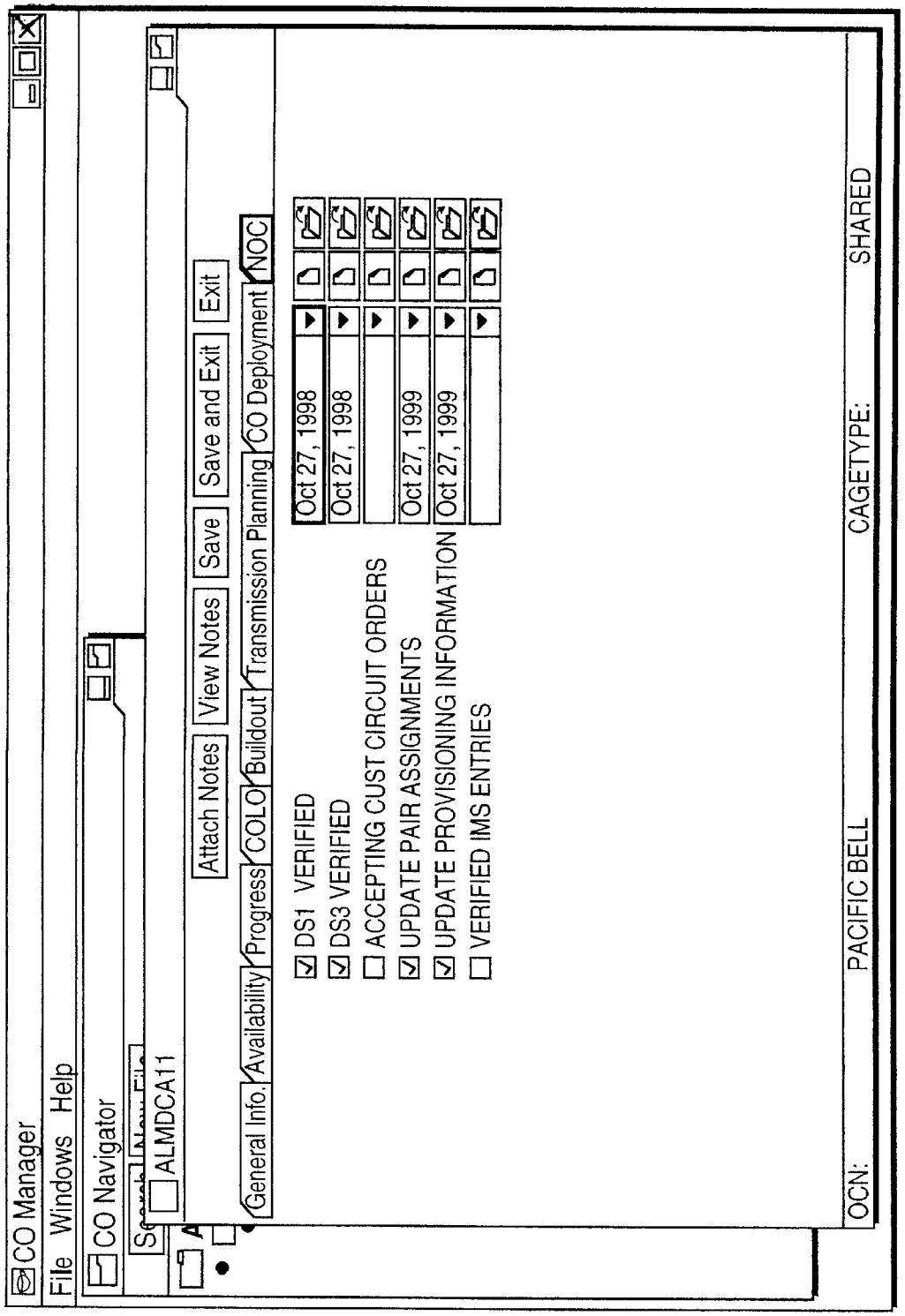

FIG. 8J depicts a displayed screen corresponding to the 'NOC' (network operations control) tab. The 'DS1 VERIFIED' and 'DS3 VERIFIED' fields are used to indicate whether and when the DS1 and DS3 circuit have been verified by the network operations group respectively. The 'ACCEPTING CUST CIRCUIT ORDERS' indicates whether and when orders for circuits to the target networks (157-A and 157-B) are being accepted.

The remaining entries are used for flow-through provisioning and inventory management. The 'UPDATE PAIR ASS1GNMENTS' field is used to indicate whether and when the pair assignment information has been updated. That is, the ports (on routers) to which the pair of wires are connected to may be entered into an inventory management system (IMS). The 'UPDATE PROVISIONING INFORMATION' field is used to indicate whether and when the other provisioning information is updated. The information may include the specific xDSL (IDSL, ADSL, or SDSL) which may be supported on each port of DSLAM 340, and the connection of each port of DSLAM 340 to the corresponding port on mini-distribution frame 320.

As described below in further detail, the pair assignments information and provisioning information may be used for ordering a loop when a request to add a new user location is received or when a virtual circuit is provisioned for the user location. The 'VERIFIED IMS ENTRIES' field is used to indicate whether and when the entries in the inventory management system have been verified. As the accuracy of the information may be important, it may be necessary to have another party verify the information. Accordingly, the entry may be checked off after the information has been verified.

Also, in one embodiment, the 'actual availability' entries of the 'availability' tab of FIG. 8B are not activated (cannot be set to be available) until 'verified IMS' field of FIG. 8J is checked off. In other words, this is an example illustrating the manner in which dependencies (required sequence) can be enforced using operational support system provided in accordance with the present invention.

Thus, by providing a checklist of tasks to be performed, and having the tasks to be checked off when performed, computer system 500 enables a CLEC to conveniently manage the rollout of many central offices simultaneously. In addition, computer system 500 may perform various checks to ensure any required sub-tasks are performed before a task is deemed to have been performed.

IV. Order Entry

Local exchange carriers (both ILECs and CLECs) may need to accept orders, for example, for connections to new user locations. With reference to FIG. 1, the requestor of the order can be, among others, an ISP (providing remote access to a user at the user location to be connected to) related to target network 170-B, the end user at user location 110, or an employer related to target network 170-A.

When a requestor places an order for a connection to a new location, it may be desirable to set the expectations of the requestor as early as possible regarding the availability of the requested services. In some cases, it may be helpful to even indicate the services which are available from the corresponding user location and let the user select from the available services.

Furthermore, the availability of the requested service may need to be determined accurately at least to optimize the effort to plan and deliver the service. For example, if a requestor requests a connection based on ADSL, it is desirable that the determination as to whether ADSL can be supported by the local loop (connecting to the user location) be performed accurately. Otherwise, the customers may not be satisfied with the service provider. In addition, if the service availability is determined inaccurately, the operations support overhead to resolve the resulting problems in the delivery of the service may be unacceptably high.

In addition, the fulfillment of an order usually requires instances of some resource types to be provided exclusively for the user location. Fulfilment generally refers to completing any necessary tasks (including securing the necessary resources, configuration, testing, etc.) to provide the specified service. DSLAM ports represent a resource type. Each DSLAM port may be viewed as an instance of the resource type. An instance of such resource type is provided exclusively for a user location as each port is dedicated exclusively for the user location.

As an illustration, with reference to FIG. 3, a limited number of ports may be present on DSLAM 340, and only some of the ports may support ADSL. As several orders may request ADSL based services, it may be advantageous to reserve one of the available ports supporting ADSL if an order is qualified for the ADSL service. By reserving the port, operational support system 190 may ensure that the resource is available for the user location.

The manner in which OSS 190 at least some of the above-noted problems with respect to order entry are described below.

IV. A. Order Processing in General

One solution to address some of the considerations of above is to accurately 'pre-qualify' the orders. Pre-qualification generally refers to making a preliminary determination as to the availability of the desired services (feasibility of the desired high bandwidth connection), and notifying the results to the customer. The notification may need to be performed while a requestor enters an order or in a short duration thereafter so that the customer expectations are set quickly.

The preliminary determination can be made with varying degrees of accuracy, depending on the available information. Thus, the later determination of actual availability may indicate that the preliminary determination is inaccurate. However, occasional erroneous indications of service availability during pre-qualification may be acceptable to many service providers and requesters because of the other advantages of pre-qualification.

In addition, operational support system 190 may reserve the resources which may be exclusive used for fulfilling an accepted order. For example, operational support system 190 may reserve a port on the DSLAM which may be required to fulfill the order. The manner in which operational support system 190 may process a received order is described below in further detail.

IV. B. Method for Processing an Order

Figure 9:
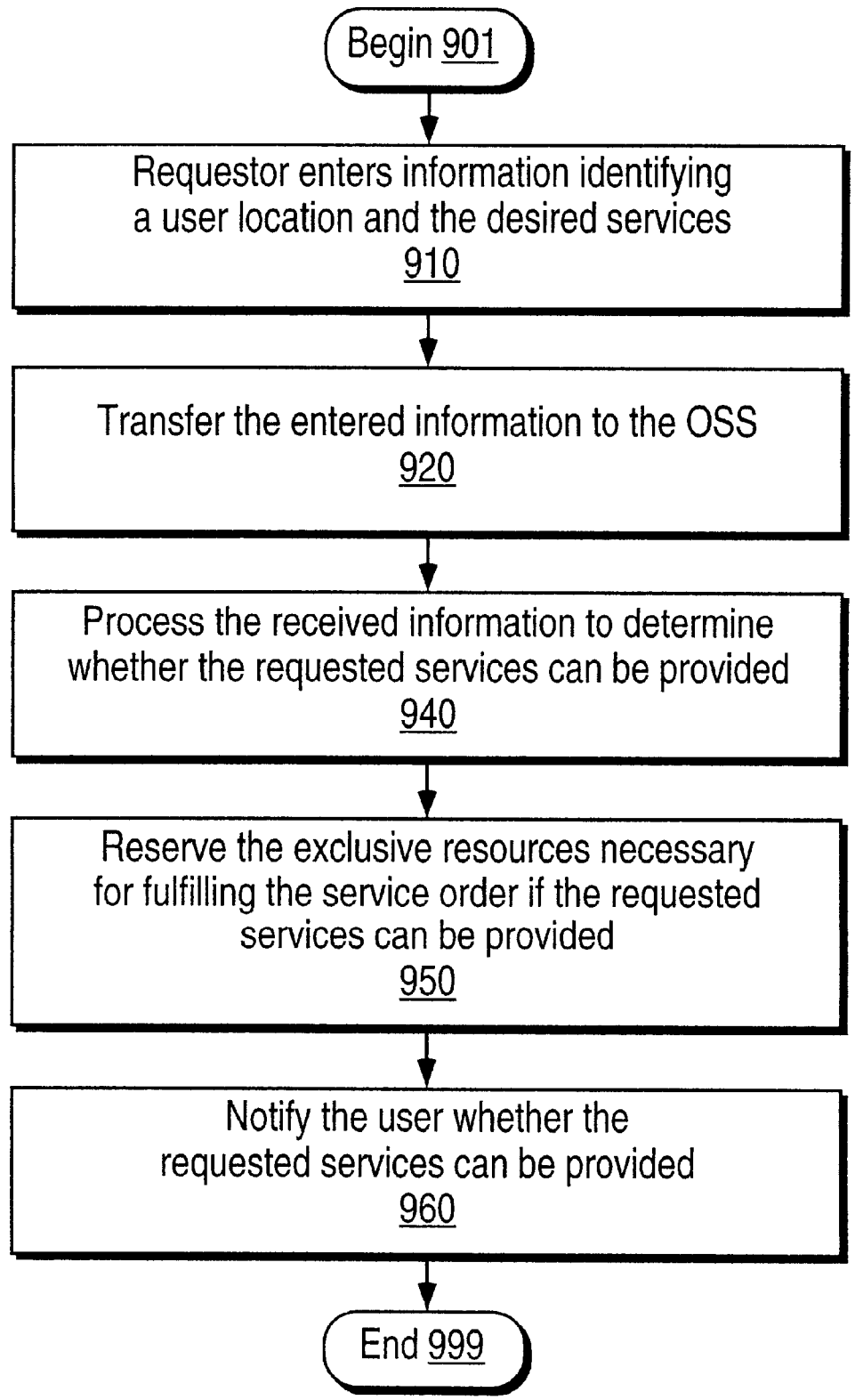
FIG. 9 depicts a flow-chart illustrating the manner in which a service order may be entered in an example scenario in accordance with the present invention.

FIG. 9 is a flow-chart illustrating a method according to the present invention using which an operational support system provided according to the present invention may process an order requesting a high bandwidth connection to a user location. Even though the description is provided substantially in the context of DSL based services, the present invention can be applied in other types of environments as well. The method begins in step 901, in which control immediately passes to step 910. In step 910, a requestor enters into a computer system the information identifying a user location and the desired services.

In the examples described below, a user location is specified either by a phone number assigned to the user location and/or the street address. However, the user location may be identified in one of several possible ways (using a combination of graphics and text based interfaces) as will be apparent to one skilled in the relevant arts by reading the disclosure herein. For example, the requestor may interact with a map of geographical location to identify the area in which the user location is located. All such ways are contemplated to be within the scope and spirit of the present invention.

The desired services which need to be specified include the type of DSL technology which is to be provided on the corresponding local loop. As is well known in the relevant arts, different DSL technologies provide different speeds. For example, IDSL typically allows only 128 Kbps or 144 Kbps bandwidth depending on the implementation, while one ADSL implementation can support bandwidth of 6.1 Mbps in the direction leaving the central office and 640 Kbps in the reverse direction.

While IDSL can generally be provided on all local loops in the United States, ADSL has the general requirements that a user location connected with a local loop needs to be within 14,000 feet (approximately 3 miles) of the central office and that the local loop be a continuous metallic path (without electronic transmission equipment) end-to-end (i.e., from home to central office) to a user location. The manner in which the service order can be pre-qualified is described below in further detail.

Continuing with reference to FIG. 9, in step 920, the information is transferred to OSS 190. The manner in which information is transferred depends on the mode in which the data is entered in step 910. For example, OSS 190 may operate as a web server to provide a web page for entering the necessary information. When the user 'submits' the information by the appropriate action (e.g., clicking on a 'submit' button, or by touching the 'enter' key), OSS 190 has access to the information immediately.

However, a service provider typically serves many organizations (owners of target networks 170), and it is generally desirable that the organizations have control over the equipment used for data entry. Accordingly, an embodiment described below with reference to FIG. 10A enables a requestor to enter data on a web page provided on a web server related to each of such organizations, and the information is transferred to OSS 190 according to a predetermined convention. Standards such as extended meta language (XML) can be used to conveniently transfer the data from the web server provided by an organization to OSS 190. However, it should be understood that many other approaches can be used for transferring the information OSS 190 without departing from the scope and spirit of the present invention.

In step 940, OSS 190 pre-qualifies the service order. That is, OSS 190 makes a preliminary determination of the availability of the service requested for the user location. Any information which indicates that a local loop of a particular region is not suited for a particular service can be stored in OSS 190, and that information can be used in the pre-qualification process.

In one embodiment, OSS 190 pre-qualifies the service based on a determination as to whether the service provider provides service in the geographical area in which the user location is located (e.g., the service provider may not yet have completed rolling over service in that area), whether the length of the local loop is greater than that required for providing ADSL type services (e.g., user location at a distance of more than 14000 feet from the central office), and whether any electrical equipment (e.g., digital loop carrier (DLC)) prevent the provision of the requested type of DSL connections.

However, other types of information may also be used in the determination of service availability. For example, a service provider may determine not to provide ADSL type services to certain target locations. Another service provider may determine not to provide IDSL type services due to inadequate number of IDSL ports on a DSLAM supporting the user location. In general, capacity planning and marketing factors are among the considerations that may be employed in determining whether to pre-qualify a service order.

OSS 190 may also consider the availability of any resources required exclusively for fulfilling the service order. The manner in which ports on DSLAM 340 may be allocated to user locations is described in further detail with reference to steps 1710 and 1720 of FIG. 17 below. In summary, a table indicating the XDSL technologies which can be supported on each port, and whether the port is allocated may be maintained. The pre-qualification step may examine the table for unallocated ports with the ability to support the desired xDSL technology to serve the requested services.

In step 950, operational support system 190 may reserve any resources used exclusively for the user location specified in the order. The reserved port may be allocated to the user location when provisioning a virtual circuit as described below with reference to FIG. 19. Such reservation ensures that operational support system may fulfill the service order at a later desired time. Only if there are sufficient ports for allocation (at the date the service is to commence at the user location), operational support system 190 may pre-qualify the order for the requested service.

In step 960, the user is notified of the results of the request. The notification may be on a web page if the order is entered using a web page, by electronic mail, or by surface mail. In general, it is preferable that the user be notified immediately of the results of the prequalification.

As OSS 190 may store or otherwise have access to all the information necessary for prequalification, the service order may be per-qualified potentially while or within a few seconds of the entry of the order by a requestor. As the requestor may be notified immediately of the result of the pre-qualification, high degree of customer (requestor or user) satisfaction may be attained. Several embodiments for order entry in accordance with the present invention may be implemented as described below in further detail.

IV. C. Example Environment Illustrating Order Entry

Figure 10A:
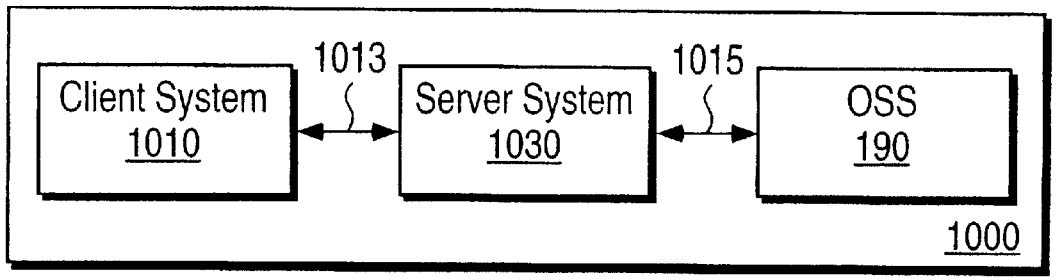
FIG. 10A is a block diagram illustrating an Internetworking environment in which the orders can be entered.

FIG. 10A is a block diagram illustrating an example telecommunication environment 1000 for entering orders in accordance with the method of FIG. 9. Telecommunication environment 1000 may include client system 1010, server system 1030, and OSS 190. Each component of telecommunication environment 1000 is described below in further detail.

Client system 1010 can be any digital processing system which can operate as a client in cooperation with server system 1030. Typically, an end user uses client system 1010 to access server system. In an embodiment, server system 1030 is implemented as a web server which can be accessed on the world-wide-web, and client system 1010 is implemented as a computer system which can access server system 1030 according to Internet Protocol (IP) on communication path 1013 well known in the relevant arts. Typically, communication path 1013 is implemented on the world-wide-web, not a part of service provider network 150.

OSS 190 is designed to store or otherwise have access to the information that may be required for pre-qualifying a service order in accordance with the present invention. In an embodiment, OSS 190 receives from server system 1030 information identifying the user location, desired services, and the date from which the services are desired. OSS 190 then processes the received information to determine whether the requested services can be provided.

Thus, in operation in a typical scenario, a requestor accesses web pages provided by server system 1030. The web page provides various fields which can be filled by the requestor (in this case, the end user). The fields may include the address of the user location, telephone number, type of DSL service desired, and the desired start-date (range) for the service.

The entered information is transferred to OSS 190. Additional information can be transferred as well. For example, data identifying the target network (170-A or 170-B in FIG. 1) may also be sent. Typically, the target network is determined by the web server providing the web pages, as each organization may provide their own web pages for order entry. Accordingly, such information may be provided to OSS 190. In the alternative, if the same web pages (or web servers) pages are used to enter the user location information and service requirements, additional information indicating the target network to which connectivity is desired may also need to be indicated.

Any compatible interface can be used to transfer the data to OSS 190. In one embodiment, XML based interface is provided on interface 1015. Computer system 500 extracts the relevant data by interpreting the XML fields. The implementation of XML interface in the context of the present invention will be apparent to one skilled in the relevant arts based on the description provided herein.

OSS 190 processes the received information to pre-qualify the service order, that is, makes a preliminary determination as to whether the requested services can be provided to the user location. OSS 190 may also reserve any resources (e.g., port on a DSLAM) used exclusively for the user location specified in a order. OSS 190 may then notify the requestor of the result. For example, OSS 190 may send data indication whether the requested service is available or not to server system 1030, and server system 1030 may, in turn, notify the requestor with an appropriate user interface (e.g., a web page containing the results). Thus, the requestor gets at least a preliminary indication as soon as the data necessary for pre-qualification is provided.

Even though server system 1030 is described as providing the forms to fill, it may be possible to implement order entry system without server system 1030 as illustrated with reference to FIG. 10B. Client system 1060 may have forms provided locally (on client system 1060). When a requestor enters information related to a user location, XML-based software may be implemented, which transfers the data required to OSS 190 immediately upon entry (without the requestor having to send the web page to any server).

Figure 10B:
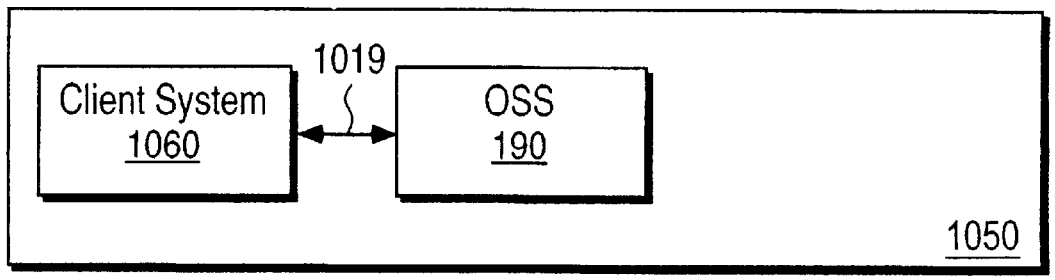
FIG. 10B is a block diagram illustrating an Internetworking environment in which the orders can be entered.

While the implementation of FIG. 10A may be suited for end users accessing a target location provided by an internet service provider (ISP) and employees accessing a target location provided by an employer, the implementation of FIG. 10B may be suited in the case of organizations such as employers which have departments dedicated for requesting services for the employees from home. OSS 190 may pre-qualify the user for the entered services, and send data reflecting the results of the pre-qualification.

IV. D. Alternative Interface for Order Entry

One problem with the above-described order entry method (including notification of pre-qualification results) is that a requestor may end-up requesting several services which the service provider may not be able to provide. For example, a requestor may request ADSL connection to a user location, and ADSL may not be possible to such location. Even worse, the service provider may not yet have rolled out service in the central office serving the user location. The requestor's time and energy may be wasted in such situations, and is thus undesirable.

Figure 11:
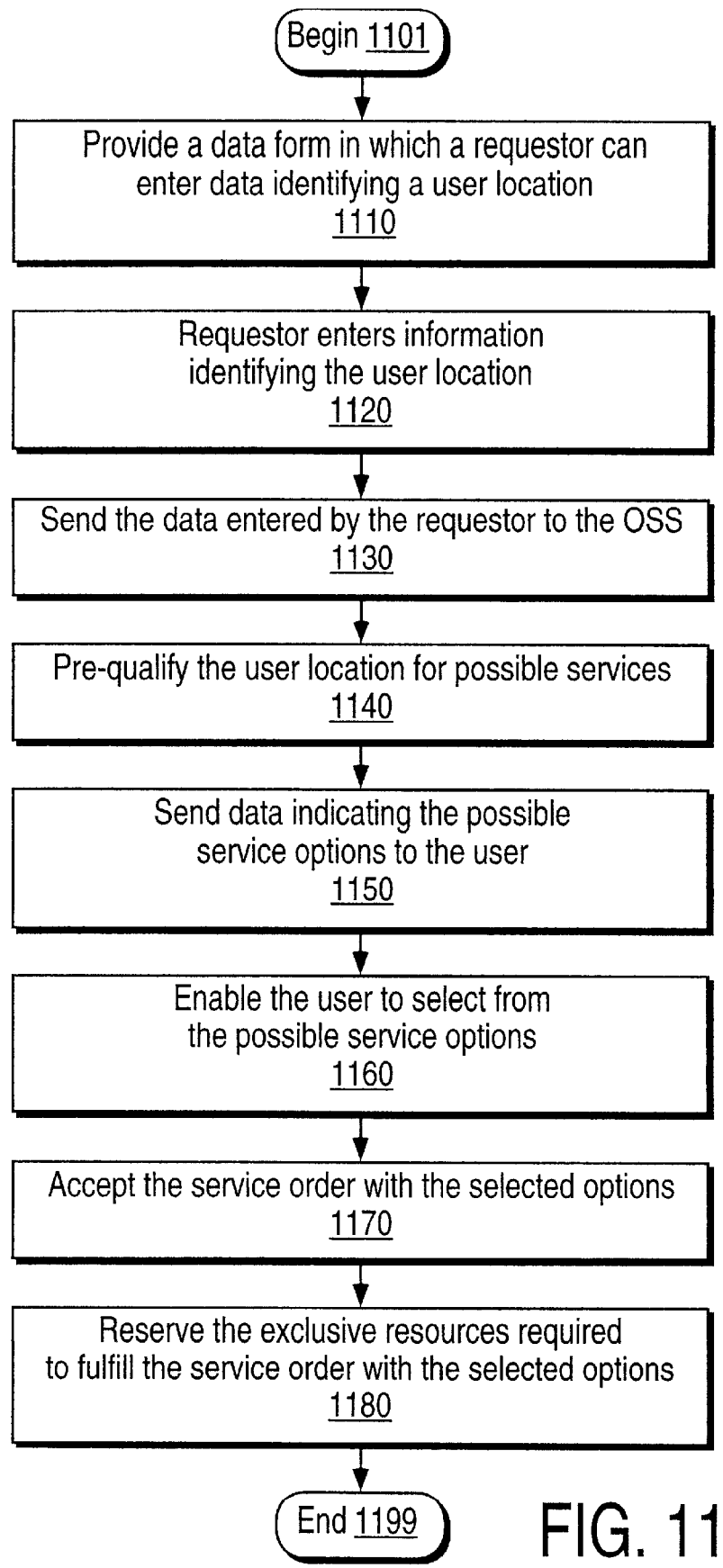
FIG. 11 depicts a flow-chart illustrating an alternative approach for entering service orders.
Figure 12B:
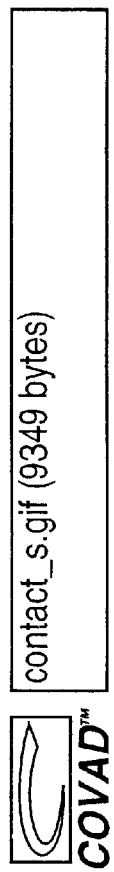

Accordingly, in an alternative user interface illustrated with reference to FIGS. 11 and 12A–12C, the order entry is made simpler and convenient for the requestor. FIG. 11 is a flow-chart illustrating a method according to the present invention, and FIGS. 12A–12C are screens displayed to the requestor while entering an order. FIGS. 11 and 12A–12C are described with reference to FIG. 10A for illustration.

In step 1110, a data form may be provided in which a requestor can enter data identifying a user location as illustrated with reference to FIG. 12A. The data form is displayed on client system 1010. The field entitled 'Corporation/ISP Name' is used to identify the organization related to the target network to which a connection is sought from the user location. The field entitled 'Contact Name' identifies the contact person for the organization.

The end-user information is used to identify the user location at which the service is being requested. The 'Installation Telephone' field can be used to enter a phone number at the user location, which is used in addition to the DSL service presently being requested. The entered telephone number (first six digits of the ten digit U.S. telephone numbers) may identify the general area in which the user location is located. However, a requestor may erroneously provide incorrect number, and accordingly the address of the user location as specified by the 'Installation Address', 'Unit', 'City', 'State', and 'Zip Code' may be used to identify the general geographic area in which the user location is located.

In step 1120, a requestor enters the information in the form of FIG. 12A. The entered data is transferred to OSS 190 in step 1130. In the embodiment of FIG. 10A, the data is transferred to server system 1030 when the requestor clicks on (a general term for selecting) 'Continue' button of FIG. 12A. In turn, server system 1030 sends the data to OSS 190 according to a pre-specified convention (e.g., XML).

In step 1140, OSS 190 determines the service options which may be possible for the service order. In other words, OSS 190 pre-qualifies the user location for some services. In general, OSS 190 determines whether the service provider serves the central office connecting to the user location. If the service provider does not serve the central office, the user location may not qualify for any services. In some cases, as described in sections above, there may be anticipated date (see FIG. 8B) from which the orders may be accepted, and the requestor may be notified accordingly.

In addition, the length of the local loop between the central office and the user location, and the presence of any electrical equipment in the path of the local loop determines the speeds (DSL technologies) which may be supported on the local loop. In addition, marketing and other considerations (e.g., whether to support high bandwidth connections between different cities) may be used to determine the possible service options. As noted above, the availability of resources required exclusively for the use of the user location specified in the service order may also be considered in the determination. The manner in which the pre-qualification can be performed is described in further detail in sections below.

In step 1150, OSS 190 sends the data indicating the service options to the requestor. In the embodiment of FIG. 10A, OSS 190 sends the data to server system 1030 according to a pre-determined interface (e.g., XML), and server system 1030 generates the data forms which enable the user to select from the available service options.

In step 1160, the user may select from the possible service options as illustrated with reference to FIG. 12B. 'Circuit' refers to the possible circuits which relate to the organization to which the requestor belongs. For example, an ISP may have presence in both New York and San Francisco, and multiple circuits may be provided in each location. Assuming, the user location is in San Francisco, the circuits related to the ISP in the San Francisco area are shown as options in the section entitled 'COVAD LOCAL SERVICES' of FIG. 12B. The circuits related to the ISP in the New York are shown as options in the sections entitled, 'REMOTE COVAD SERVICES'.

The requestor may select one or both of the local and remote services. However, the displayed options may reflect the technical (e.g., possibility of ADSL), capacity management (e.g., high bandwidth may not be guaranteed with a probability required by a service level agreement) and marketing (e.g., marketing department may wish not to provide some type of connections in some type of locations) considerations. Thus, in step 1160, a requestor may select from among the displayed options (i.e., pre-qualified options).

In step 1170, the order with the selected options may be accepted by OSS 190. In the embodiment of FIG. 10A, server system 1030 receives the data reflecting the options selected by the user. Server system 1030 then forwards the data to OSS 190, which may process the order further as described in further detail below. Upon receiving data identifying the selected option, in step 1180, OSS 190 may reserve any resources required exclusively for the user location specified in the order. OSS 190 may update any internal tables (databases) to identify such a reservation.

From the above, it should be understood that the present invention provides for convenient processing of orders by pre-qualifying service orders, and informing the requestor of the result quickly. An embodiment of OSS 190 supporting the order entry is described below in further detail.

IV. E. OSS 190 Portion Assisting with Order Processing

Figure 13:
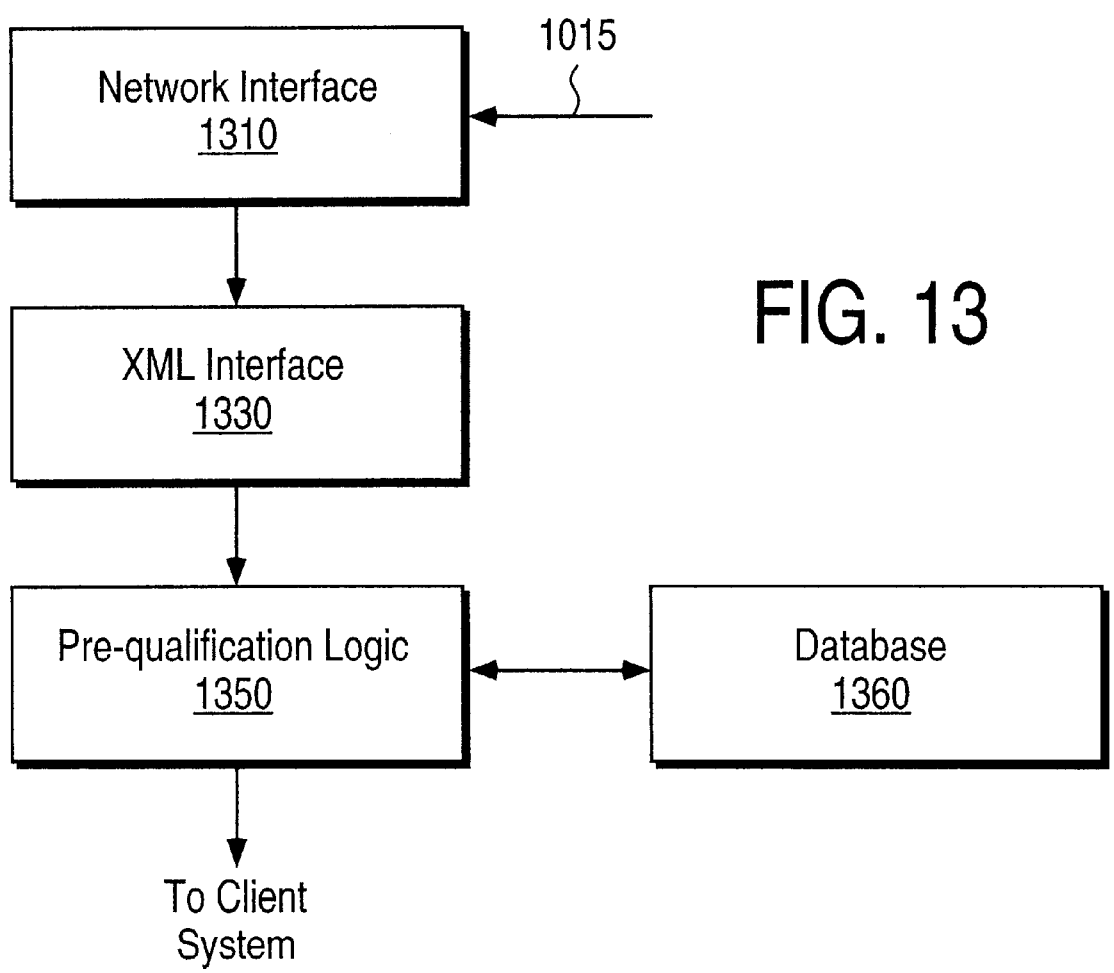
FIG. 13 is a block diagram illustrating the modules in a software implementation of an OSS for receiving service orders in accordance with the present invention.

The portion of OSS 190 assisting with order entry may be implemented as software in computer system 500. The description of the software as relevant to order entry only is described in the present section. FIG. 13 is a block diagram illustrating a software implementation of order entry portion of OSS 190. The software may contain network interface 1310, XML interface 1330, pre-qualification logic 1350, and data base 1360. Each component is described below in further detail.

Network interface 1310 may be receive data according a pre-specified network protocol such as TCP/IP well known in the relevant arts. The data may be passed to XML interface 1330 assuming that the data entered during order placement is received in the form of XML. XML interface 1330 may examine the tags to extract the user location information (e.g., that entered in FIG. 12A).

By using the XML interface, OSS 190 may allow different organizations (web servers) to provide custom interfaces to the requester during order entry. In addition, OSS 190 may operate in conjunction with order entry systems other than those based on web server based technology of FIG. 10A.

Pre-qualification logic 1350 processes the user location information to pre-qualify the service order. Database 1360 may store the data required for such pre-qualification. In one embodiment, pre-qualification logic 1350 receives the service requirements specified in an order (e.g., as in FIG. 9), and indicates whether the required services can be provided. In an alternative embodiment, pre-qualification logic 1350 may receive user location information and provide the various service options to the user (as in FIG. 11).

Pre-qualification logic 1350 may examine the data in database 1360 to determine the availability of any resources required exclusively for user location specified in an order. The resources may be reserved for the user location, for example, after the specific services selected by the user are known. In the alternative, in a more conservative approach, the resources required for all the choices provided in FIG. 12A may be reserved for a short while to ensure that the user specified service is provided.

However, several variations to these embodiments may be implemented without departing from the scope and spirit of the present invention as will be apparent to one skilled in the relevant arts. For example, the resource determination and reservation operations can be implemented in other portions of OSS 190, potentially in a combination of one or more of hardware, software and firmware without departing from the scope and spirit of the present invention. The pre-qualification process is described below in further detail with reference to some examples.

V. Pre-Qualification

As noted above, pre-qualification refers to an initial determination of whether the services desired by a user can be provided. As noted above, OSS 190 may simplify order entry by prequalifying service orders as noted above. Even though the determination of feasible services is described here in the context of pre-qualification, it should be understood that the approaches can be used in other contexts as well. The manner in which OSS 190 may determine feasible services to a user location is described in further detail below.

V. A. Method of Pre-qualification

Figure 14:
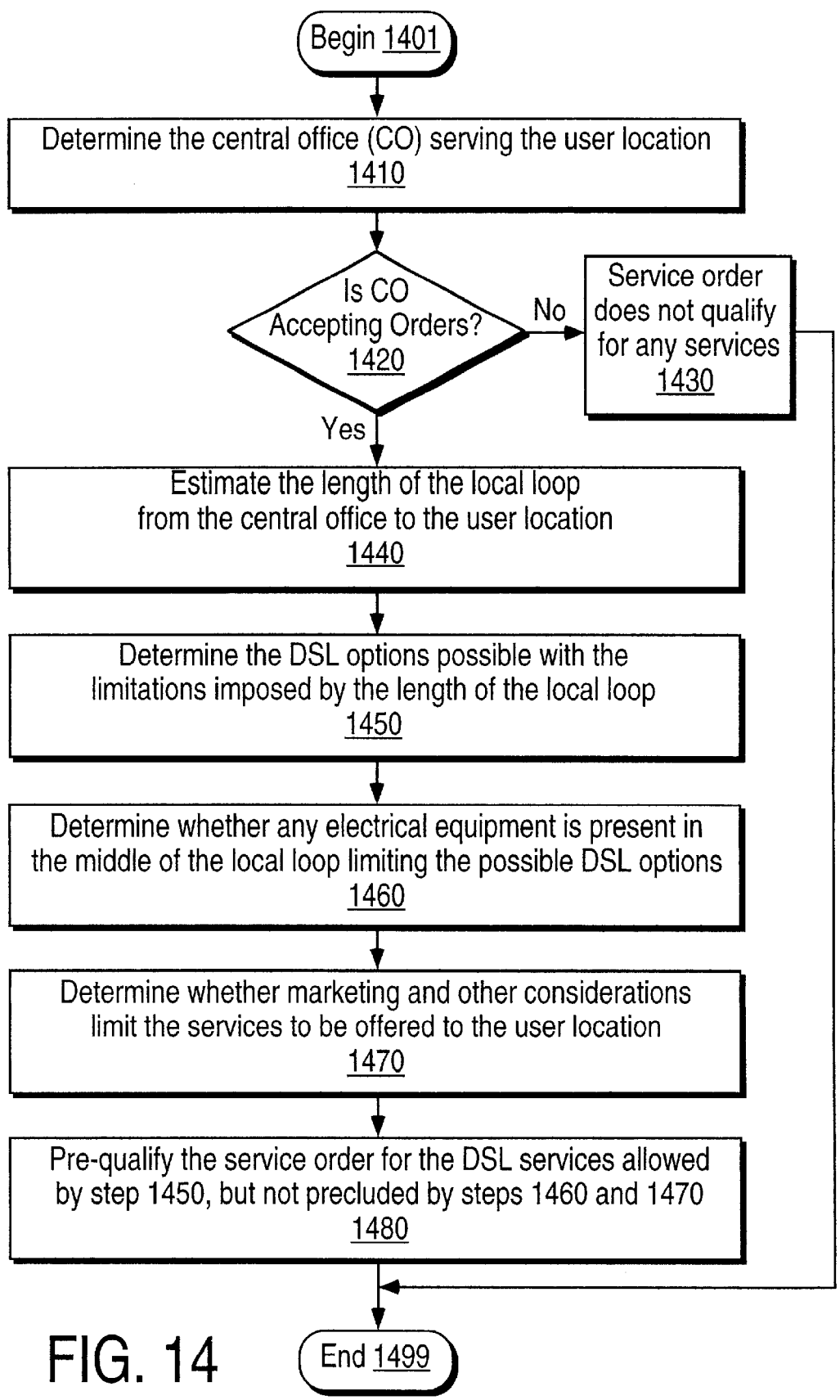
FIG. 14 is a flow-chart illustrating an example approach for pre-qualifying a service order in accordance with the present invention.

FIG. 14 is a flow-chart illustrating an example method for pre-qualification process in accordance with the present invention. The method begins in step 1401 in which control passes to step 1410. In step 1410, OSS 190 determines the central office which serves the user location specified in the service order. Several approaches may be employed in the determination of the central office depending on the manner in which the user location is specified. Some example approaches are described in the sections below.

In step 1420, OSS 190 determine whether orders are being accepted for service through the central office serving the user location. If orders are not being accepted, control passes to step 1430, in which the service order not qualified for any service options. If orders are being accepted, control passes to step 1440.

In step 1440, the length of the local loop may be estimated. The length is typically relevant to determine whether high speed DSL options such ADSL and SDSL may be provided as options to a service order. Some considerations in the determination of the length of the loop are noted in the section below. In step 1450, the DSL options possible with the limitations imposed by the length of the local loop are determined. Each combination of options may be viewed as defining a type of DSL service. Speed is one variable and type of DSL technology is another variable in the classification of types of service.

In step 1460, OSS 190 may determine whether any electrical equipment may be present in the local loop between the central office and the user location. DLCs are examples of such equipment, which also limit the DSL choices which may be offered to the user location. Typically, the determination of the presence of the electrical equipment is based on data stored in database 1360.

Data identifying the presence of the electrical equipment may be readily available for the ILECs. As more DLCs are deployed, the ILEC may add data reflecting the additions also. However, such data may not be readily available to the CLECs. Accordingly, in accordance with an aspect of the present invention, data indicating the presence of the the electrical equipment (e.g., DLCs) may be stored in database 1360.

More data reflecting the presence of the electrical equipment in the local loops may be added as the DSL services are deployed to various user locations. For example, when an apartment in a apartment complex is provided a DSL service, and the service provider (ILEC or CLEC) determines that the apartment is served by a DLC, data reflecting the presence of the DLC at that address may be added. When a service order is placed for another apartment in the apartment complex, it may be assumed that the local loop to this another apartment also has a DLC in the middle.

In general, database 1360 may store information related to the presence of different electrical equipment in different 'neighborhoods' and use the information in the pre-qualification process. In one embodiment, the equipment information may be correlate to the geo-code (described below in further detail) reflecting the longitude and latitude such that electrical equipment in the neighborhood can be readily detected, and pre-qualification can be performed using that information.

Continuing with reference to FIG. 14, database 1360 may also store data reflecting marketing or other consideration in limiting the service choices. For example, it may be determined not to allow DSL connections between San Francisco and New York for a particular ISP. As another example, the local loops connecting to some central offices may not be of sufficiently robust quality to support high speed DSL technologies. In some other areas, stricter thresholds (e.g., lower loop lengths) may be used in pre-qualifying a user local location for high speed DSL services. OSS 190 may limit the offered choices accordingly.

It should be understood that pre-qualification merely provides a preliminary indication of the availability of services. However, some of the determinations of service options may be erroneous. The errors, if terminal, are acceptable due to the customer satisfaction and the ability to plan the delivery of the service. Also, the reasons for not providing choices may be communicated to the requestor so that further investigation may be performed on the accuracy of the assumptions made by OSS 190. Some of the steps of FIG. 14 are described below in further detail.

V. B. Determining Central Office to Which the User Location is Connected

As noted above, OSS 190 may determine the central office serving the user location specified in a service order. As noted above with reference to FIG. 12A, in one user interface, the requester may enter a phone number at the user location and the address of the user location. The manner in which the entered information can be used to determine the central office is described below with reference to several examples.

In one embodiment, the first six digits of a 10-digit phone number (in the United States) at the user location (entered in the form of FIG. 12A) may be used to determine the central office serving the user location. As is well known in the relevant arts, the Local Exchange Routing Guide (LERG) database available from TelCordia (formerly BellCore) may be used in such a determination.

However, one problem with such an approach is that the provided telephone number may not accurately reflect the geographical area in which the user location is situated. For example, a requestor may provide a cell phone number assuming that the requested number is merely a contact number. In some other situations, the portability of phone numbers (e.g., using a foreign exchange line) across central offices may also lead to erroneous results. In addition, the data in the LERG database may itself be erroneous.

The resulting erroneous determination of the central office may lead to several problems. For example, a local loop may be ordered from the wrong central office, resulting in unneeded overhead and also delay in processing the order. In addition, the user location may be qualified for a different set of services than that would actually be possible, leading to further sub-optimal solutions.

Figure 15:
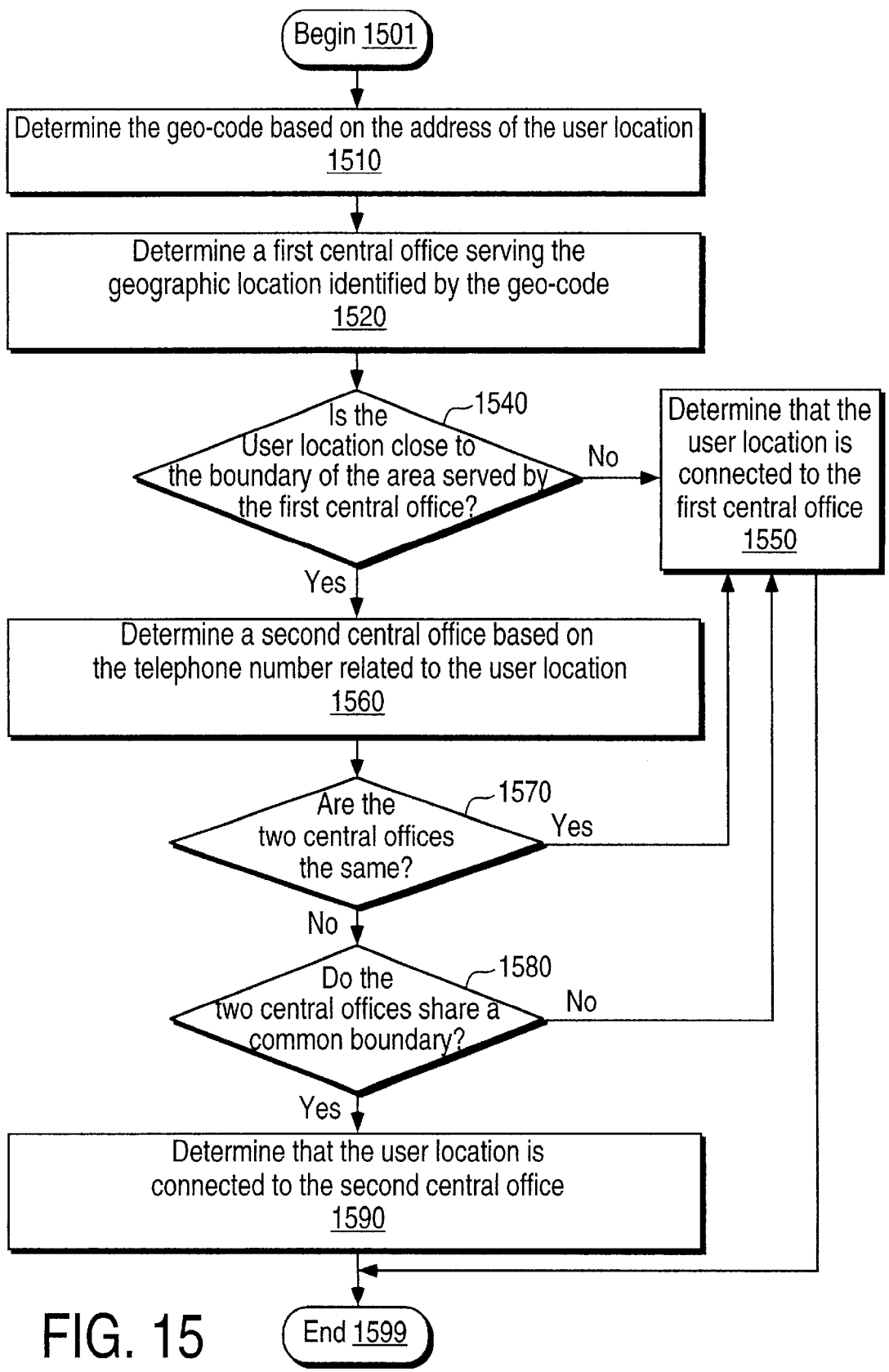
FIG. 15 is a flow-chart illustrating an approach for determining the central office to which a user location is connected may be determined.
Figure 16:
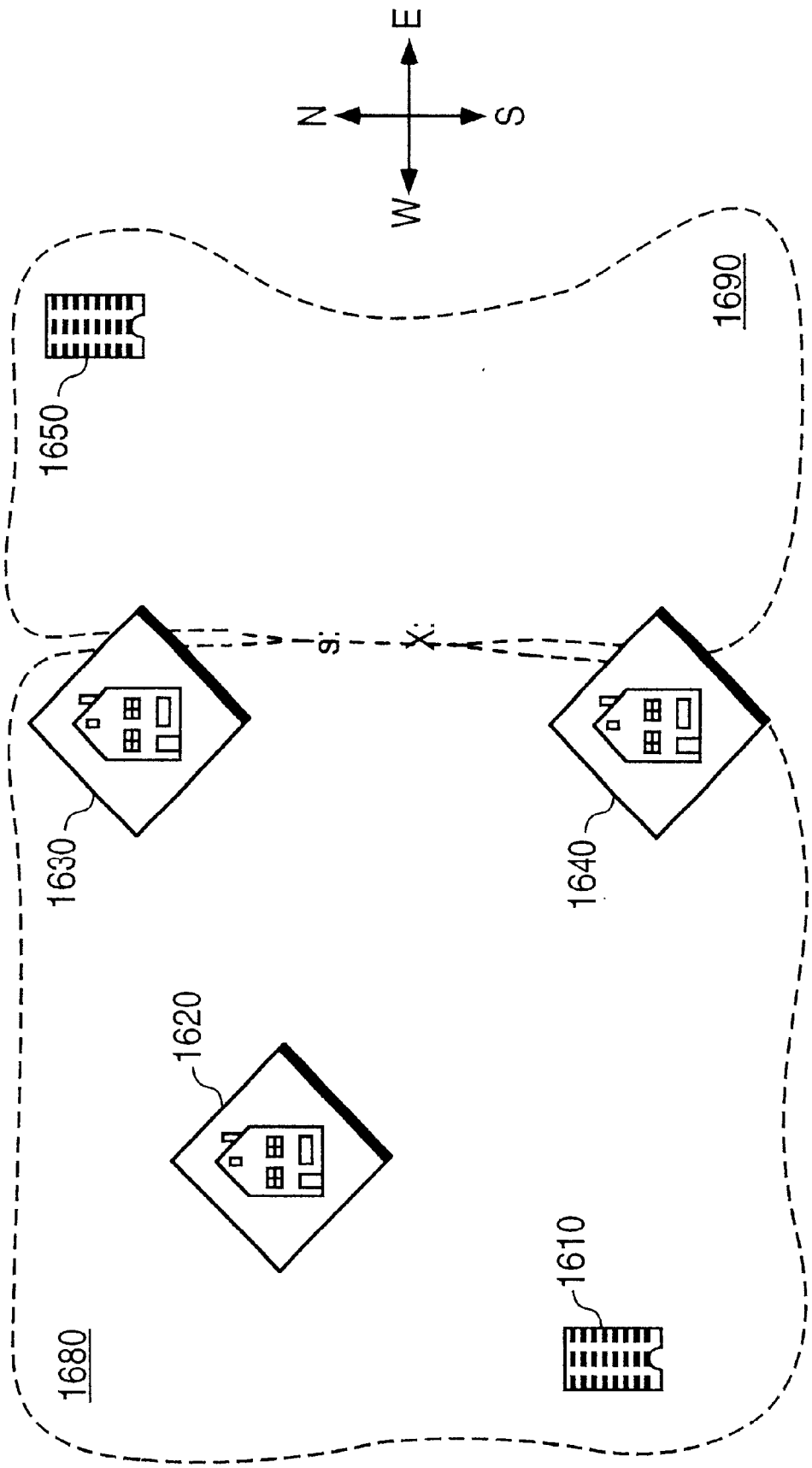
FIG. 16 is a diagram illustrating with an example an approach for determining the central office to which a user location is connected.

Accordingly, in an alternative approach, two inputs (e.g., address and telephone number) received from a requestor may be used in pre-qualifying a user location for DSL based services. An example implementation of such an alternative approach is described below with reference to FIGS. 15 and 16. FIG. 15 is a flow chart illustrating the steps according to an example implementation for determining the central office which services a user location. FIG. 16 is a diagram illustrating how the address and phone number combination can be used to determine the central office.

The method of FIG. 15 begins in step 1501, in which control passes to step 1510. In step 1510, a geo-code containing, for example, the longitude and latitude of the user location may be generated from well known products available in the market place. In an example implementation, a database available from MapQuest.com, 257 Park Ave, South, Suite 303 New York, N.Y. 10010-7304, Telephone No.: (212) 904-0400 may be used. The database accepts a user location as an input and provides the geo code for the user location.

In step 1520, OSS 190 may determine a first central office serving the geographic area identified by the geo-code (determined based on location address). In one embodiment, a database (wire center boundary database) available from MapQuest.com maintains data identifying boundary of area served by each central office. When the geo-code is provided as an input, a central office identifier (identifying the first central office) is returned as the output. Steps 1510 and 1520 together form an example approach for determining a central office serving the user location as identified by the address entered by a requestor.

Thus, in FIG. 16, boundaries 1680 and 1690 may respectively represent the boundaries of the areas served by central offices 1610 and 1650. Upon performance of step 1520, user locations 1620, 1630, and 1640 may be determined to be within boundary 1680.

Continuing with reference to FIG. 15, in step 1540, OSS 190 may determine whether the user location is close to the boundary of the first central office. In an embodiment, such a determination may be made by performing step 1520 four times, with geo-code provided corresponding to ¼ mile in the four (north, east, west and south) directions respectively.

To clarify with an example, in FIG. 16, for home 1630, a determination may be made whether four points ¼ mile in the eastern, western, northern and southern directions are within boundary 1680. Thus, the points to south and west may be determined to be within boundary 1680, and the point to the east may be determined to be in the area served by central office 1610 as specified by boundary 1690.

As at least one of the four points is determined to be outside of the area served by central office 1610, user location 1630 may be determined to be close to the boundary of the area served by central office 1610. In contrast, all the four points (in four directions) corresponding to user location 1620 may be determined to be within the area served by central office 1610. Accordingly, user location 1620 may be determined to not be within the area served by central office 1610.

If a user location is determined not to be close to the boundary of the area served by the first central office (determined in step 1520), the user location may be determined to be connected to the first central office. Thus, with respect to FIG. 16, user location 1620 may be determined to be connected to central office 1610.

If the user location is determined to be close the boundary of the area served by the first central office, a second central office may be determined according to the first six digits of the ten digit telephone numbers (in U.S.) in step 1560. In step 1570, a determination is made whether the first central office is the same as the second central office. That is, a determination is made as to whether the phone number and the address indicate that the user location is connected to the same central office. If both determinations indicate that it is the same central office, the user location is determined to be connected to that central office in step 1550.

If the determination of step 1570 indicates that the first central office is not the same as the second central office, control passes to step 1580. In step 1580, a determination is made as to whether the first and second central offices share a common boundary, that is, whether the service areas are contiguous. Such a determination can be made using the tools (MapQuest.com) noted in steps 1510 and 1520.

If the areas served by the first and second central offices share a common boundary, the user location may be determined to be connected to the second central office. With reference to FIG. 16, the second central office for user location 1640 may be determined to be central office 1650 and the first central office may be determined to be 1610. As the areas served by the two central offices 1610 and 1650 are shown sharing a common edge, user location 1630 may be determined to be connected to central office 1650.

If the areas served by the first and second central offices are determined to not share a common boundary, the user location is determined to be connected to the first central office under the assumption that the telephone number does not accurately indicate the geographical location of the user location. Thus, in FIG. 16, assuming that the first central office for user location 1640 is determined to be central office 1610, and the second central office is determined to be a central office (not shown in the Figures) serving an area east of boundary 1690, the user location is determined to be connected to central office 1610.

In general, it should be understood that a determination based on using two inputs (both the address of the user location and the phone number) may be more reliable than that based on it just one of those at least in some situations. Accordingly, various modifications may be made to the embodiments described above to determine the central office to which a user location is connected without departing from the scope and spirit of the present invention as will be apparent to one skilled in the relevant arts based on the disclosure provided herein. For example, a service provider may resort to manual procedure or a further dialogue with the requestor if the two determinations lead to different determinations. However, the flow-chart of FIG. 15 attempts to minimize such extra steps.

Once the central office is determined, the length of the local loop from the central office to the user location needs to be determined. As noted above, the length of the loop may determine the different DSL services which may be supported to the user location. The manner in the length of the local loop may be determined by OSS 190 is described below in further detail.

V. C. Determining the Length of the Local Loop

In one embodiment, the length of the loop may be estimated as a point to point distance between the central office and the user location. However, the point to point distance does may not accurately reflect the actual loop length as the local loops are typically not laid in straight line.

Alternatively, OSS 190 may use one of several publicly available software (e.g., from Yahoo) to determine the driving distance between the central office and user location. As the lorg local loops are generally laid along the roads (due to right of way issues), the driving distance may accurately reflect the length of the local loop from the central office to the user location. OSS 190 may need to parse the output generated by the software.

One problem with using the driving distances as an estimate of the length of the local loop is that traffic regulations (e.g., one way roads, left-only turns, etc.) often impose restrictions on driving paths, which are not usually applicable to the lay out of local loops. As an illustration, a one-way road may require that a different (usually longer) route be taken, but local loops are laid even on such one-way roads.

Accordingly, in another embodiment, 'walking directions' (i.e., without regard to traffic regulations) may be ascertained from a suitable software program (e.g., available from MapQuest.com), and the distance may be used as an estimate of the length of the local loop.

Using the length thus determined, OSS 190 may pre-qualify a user location for the various DSL technologies supported by the loop-length. However, delivering high bandwidth connections may require securing local loops from ILECs for providing the physical connection to the user locations, and provisioning virtual circuits between user locations and corresponding target networks on the physical connections. OSS 190 may simplify attaining the two objectives as described below in further detail.

VI. Securing Local Loops

As noted above, the services specified in the service orders are provided using local loops to the respective user locations. In the case of a CLEC as a service provider, the local loop needs to be ordered from an ILEC in the corresponding geographical area. The ordering of the loop may need to be performed efficiently such that the high bandwidth connections can be provided quickly and efficiently. Accordingly, the manner in which local loops can be secured is described below with reference to FIG. 3.

IV. 1. Method of Securing Local Loops

Figure 17:
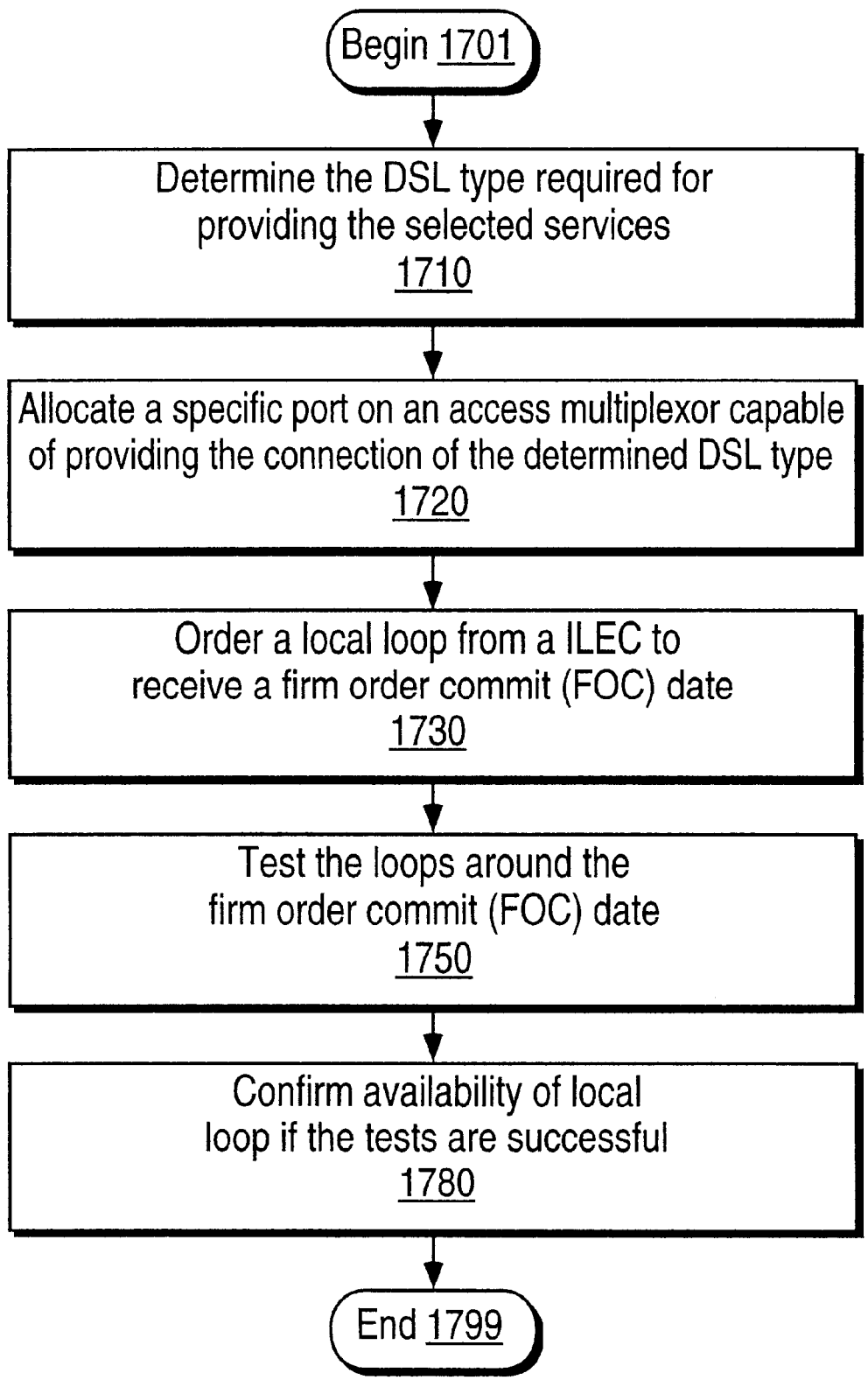
FIG. 17 is a flow-chart illustrating an approach for securing a local loop from a central office to a user location.

FIG. 17 depicts a flow-chart illustrating the manner in which a local loop may be ordered in an embodiment of the present invention. The flow-chart is illustrated with reference to FIG. 3 for illustration. Steps 1710, 1720, 1730 and 1740 together determine a port of min-distribution frame on which the local loop is to be received as described below.

In step 1710, OSS 190 may determine a DSL type for providing the services requested by a requestor. As noted above, the loop length and other consideration may determine the possible DSL options, and a requestor may request one of the possible options. The DSL type may need to be determined as each port (348 and 347) on DSLAM 340 may not be able to select all the DSL types.

In step 1720, a specific port on DSLAM 340 may be assigned for the user location. As noted above with reference to FIGS. 11 and 13, OSS 190 may ensure the availability of ports, and then reserve a port according to the service requested by a requester. However, a service provider may later assign a different port also. To manage the DSLAM port assignments, OSS 190 may maintain a table of available ports and allocate one of the unused ports for the user location. If all the DSLAM ports do not support all DSL types (of interest in service provider network 150), OSS 190 may further maintain information indicating which ports are capable of supporting which DSL types, and assign one of the ports according to the supported DSL types. The table may be updated to reflect the allocation and deallocation of the ports.

The allocated port on DSLAM 340 in turn may determine the specific port (311 and 312) in main distribution frame 310 from which the connection to the local loop delivered by the ILEC may be received. The port in main distribution frame 310 may be determined as illustrated by the pass though lines 342-A through 342-C, and 343-A through 343-C of FIG. 3.

In step 1740, an order for a local may be placed with an ILEC. ILECs typically provide a firm order commit (FOC) date. The FOC date indicates the date on which the ILEC expects to have provided the connection including installation of the cross-connects in main distribution frame (shown as dotted lines). In some cases, the ILEC may need to provide wire pairs (342-A 343-A) from main distribution frame 310 to mini-distribution frame. A port number on mini-distribution frame may uniquely identify the requested connection.

The order may be placed either manually or by interfacing with an ILEC server (not shown) using a suitable interface (e.g., electronic data interchange using XML). The order provides the specific port number in mini distribution frame 320 on which the local connection is to be provided. If such an ILEC server is provided, OSS 190 may determine at the time of order entry the expected date of start of high bandwidth connections at the user location as the other installation steps may be performed by the CLEC itself. The data may be communicated to the requestor.

In step 1750, OSS 190 may cause tester 330 to test the local loop connection preferably around the FOC date. In an embodiment, OSS 190 may transmit the commands to tester 330 via management equipment 360 and local area network 369. The commands can be in protocols such as SNMP, CMIP or proprietary to the implementation of tester 330.

The tests generally confirm whether the local loop (e.g., 115-A) is already connected to mini-distribution frame 320 and whether the local loop can support the services requested in the order placed by the customer. For example, as is well known in the relevant arts, support for technologies such as ADSL may have requirement that a local loop needs to be within 14,000 feet (approximately 3 miles) of the central office and that the local loop be a continuous metallic path (without electronic transmission equipment) between central office 210 and user location 120.

The tests may be used to confirm the results of pre-qualification noted above. In general, if the pre-qualification results are inconsistent with the results of the testing by tester 330, manual intervention may be required. The verification of feasibility of the ordered services can be performed in other stages of the service delivery process.

If the tests are successful, in step 1780, OSS 190 may determine that the requested local loop is connected for providing the ordered connection. Should any errors be encountered, OSS 110 may provide an alarm or a report to have the connections and status checked out manually.

However, at least when errors are not encountered, OSS 190 enables the provision of high bandwidth connection while minimizing manual intervention. Accordingly, the procedure can be reliable and cost-effective.

Once the physical path is present from DSLAM 340 to the user locations, DSL provides the physical transport for data to and from the user locations. To complete the connectivity to the corresponding target network requested by the requester, virtual circuits may need to be provisioned on service provider network 150. The manner in which the virtual connections may be provisioned in accordance with the present invention is described below in further detail.

VII. Provisioning Virtual Connections

Virtual circuits need to be provisioned between user locations 110-A and 110-B and the respective target networks 170-A and 170-B before the respective users can access systems at the target networks. The virtual communication may need to be provisioned with minimal overhead on the part of the service providers (CLECs and ILECs). Several aspects of the present invention allow for such minimization of the overhead as described below.

In the example embodiment of FIG. 1, target networks 170-A and 170-B may be managed by the respective organizations, and only service provider network 150 may need to be configured to provision the desired virtual circuits. The present invention allows a service provider to automatically provision the virtual circuit upon receiving an order as described below in further detail.

VI. A. View of Service Provider Network 150

Figure 18:
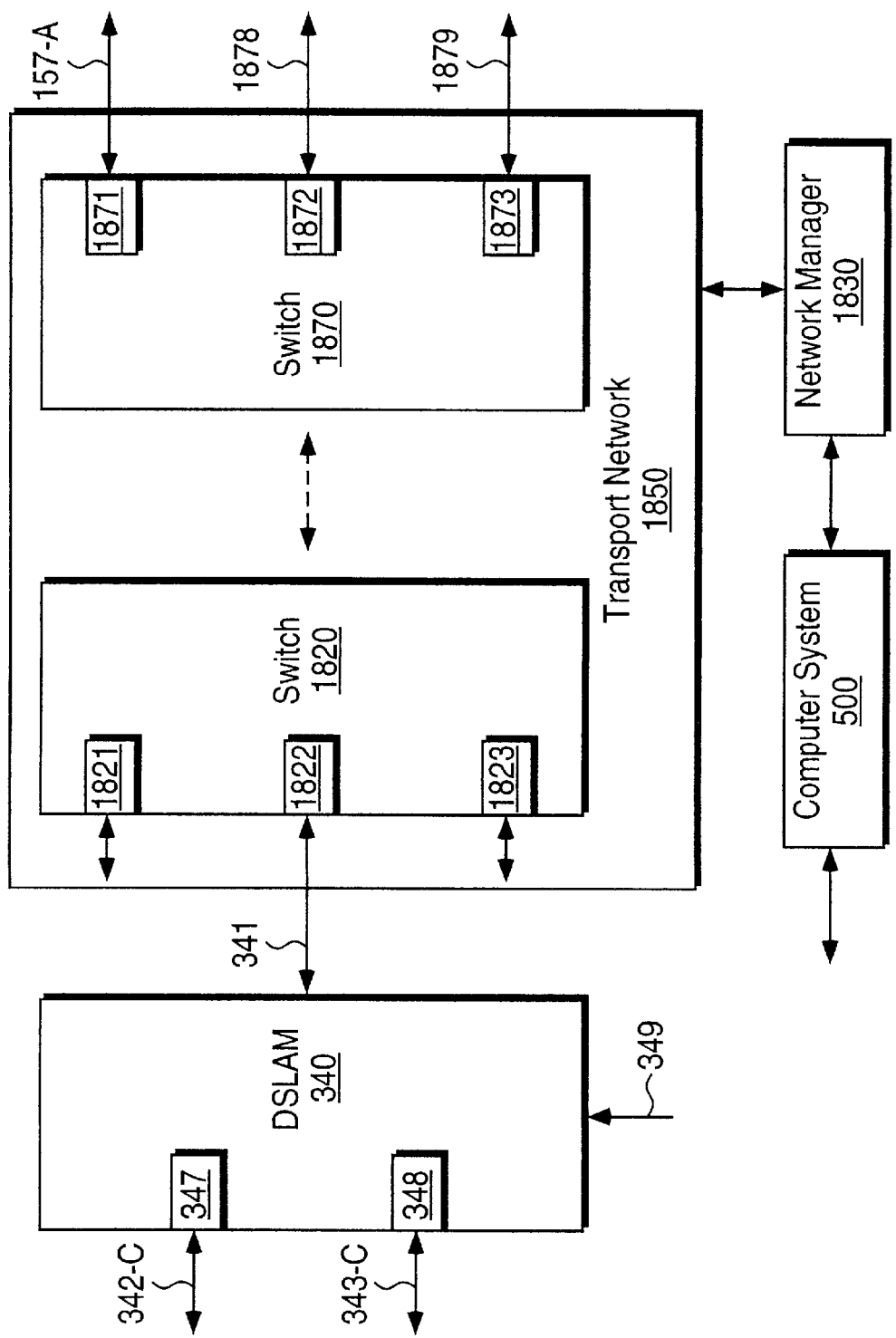
FIG. 18 is a block diagram of service provider network in one view illustrating the provisioning of a virtual circuit in accordance with the present invention.

FIG. 18 is a block diagram illustrating a view of service provider network 150 along with the systems which may used for provisioning a virtual circuit. In the DSL environment of FIGS. 1 and 18, the virtual circuits may be provided as permanent virtual circuits. Service provider network 150 may be viewed to contain DSLAM 340 and transport network 1850. OSS 190 may contain computer system 500 and network manager 1830 to provision the virtual circuits on service provider network 150 as described in further detail below.

DSLAM 340 is shown with two input ports 347 and 348 connected to local loops by connections 342-C and 343-C respectively as described above. DSLAM 340 may transmit (and receive) data related to all user ports (connected local loops) on high speed transmission line 341. Switch 1820 may be an edge switch connecting to DSLAM 340 via transmission circuit 341.

Switch 1820 may have three ports 1821–1823 to which transmission circuit 341 may potentially be connected. However, transmission line 341 is shown connected to port 1822. Switch 1870 is shown with three ports 1871, 1872 and 1873 connected respectively to transmission circuits 157-A, 1878 and 1879. Transport network 1850 typically contains several other switches, but are not shown and described as not being necessary for an understanding of the present invention.

OSS 150 may provision a PVC from each user location to corresponding target location. The PVC is provisioned in response to receiving an order for service to a new user location. The provisioning may occur as early as immediately after receiving the pertinent information in an order received from a requester.

In one embodiment, transport network 1850 may be implemented as an asynchronous transfer mode (ATM) network, and network manager 1830 may be implemented using Strataview product available from Cisco Systems, Inc. (www.cisco.com). In that embodiment, network manager 1830 may be designed to provision a PVC only on network 1830, but not in other components (e.g., DSLAM 340 and CPE in the corresponding target location). The manner in which the PVC may be provided is described below in further detail with respect to FIG. 19. However, first it is helpful to understand the theoretical basis for provisioning PVC in that embodiment.

VII. B. Theoretical Basis in Provisioning PVCs in ATM Environment

As is well known in the relevant arts, each switching device (switches 1820 and 870, and DSLAM 340) typically receives an ATM cell on an input port, and forward the data in the cell on an output port. A switch usually identifies a cell with a PVC based on the port on which the cell is received and the VPI/VCI fields in the header of the cell. The port may be uniquely identified by a port identifier and the VPI/VCI fields together may be termed as a circuit identifier. When a switching device contains multiple cards, with each card housing multiple ports, each port may be uniquely identified by a card number and a port number (within the card).

Thus, each switching device examines the cell header of a received and the port on which the cell is received to determine the virtual circuit to which the cell relates to, and replaces the VPI/VCI fields to correspond to the values expected by the next switching device in the path of the virtual circuit. As an illustration, when DSLAM 340 receives a cell on local loop 343-C, DSLAM 340 may set the VPI/VCI fields to those values which would cause switch 1820 to identify with the same virtual circuit. Accordingly, provisioning a virtual circuit entails at least the tasks of determining the switching devices to provide a connection path, and configuring the devices in the path with appropriate data such that the devices can set the VPI/VCI fields to reflect the communication path.

In the embodiment depicted in FIG. 18, network manager 1830 may be designed to configure a PVC (or portion of the PVC from user location to corresponding target network) on transport network 1850. Network manager 1830 may accept as inputs the port identifier and VPI/VCI identifier on both transmission line 341 and transmission line (157-A or 1878 or 1879) to provide the PVC portion on transport network 1850. The PVC portion may be provided in a known way.

Accordingly, computer system 500 may need to provide a VPI/VCI identifier (circuit identifier) and the corresponding port identifier on which the cells related to the PVC connecting the user location and corresponding target location may be received/transmitted from transport network 1850 to each of DSLAM 340 and the corresponding target location. In addition, DSLAM 340 and CPEs (not shown) in user location and corresponding target location may also need to be configured consistent with the VPI/VCI identifiers. The manner in which computer system 500 (OSS 150, in general) may cause such configuration automatically without requiring manual intervention is described below with reference to FIG. 19.

VIII. C. Automatic Provisioning of PVC

Figure 19:
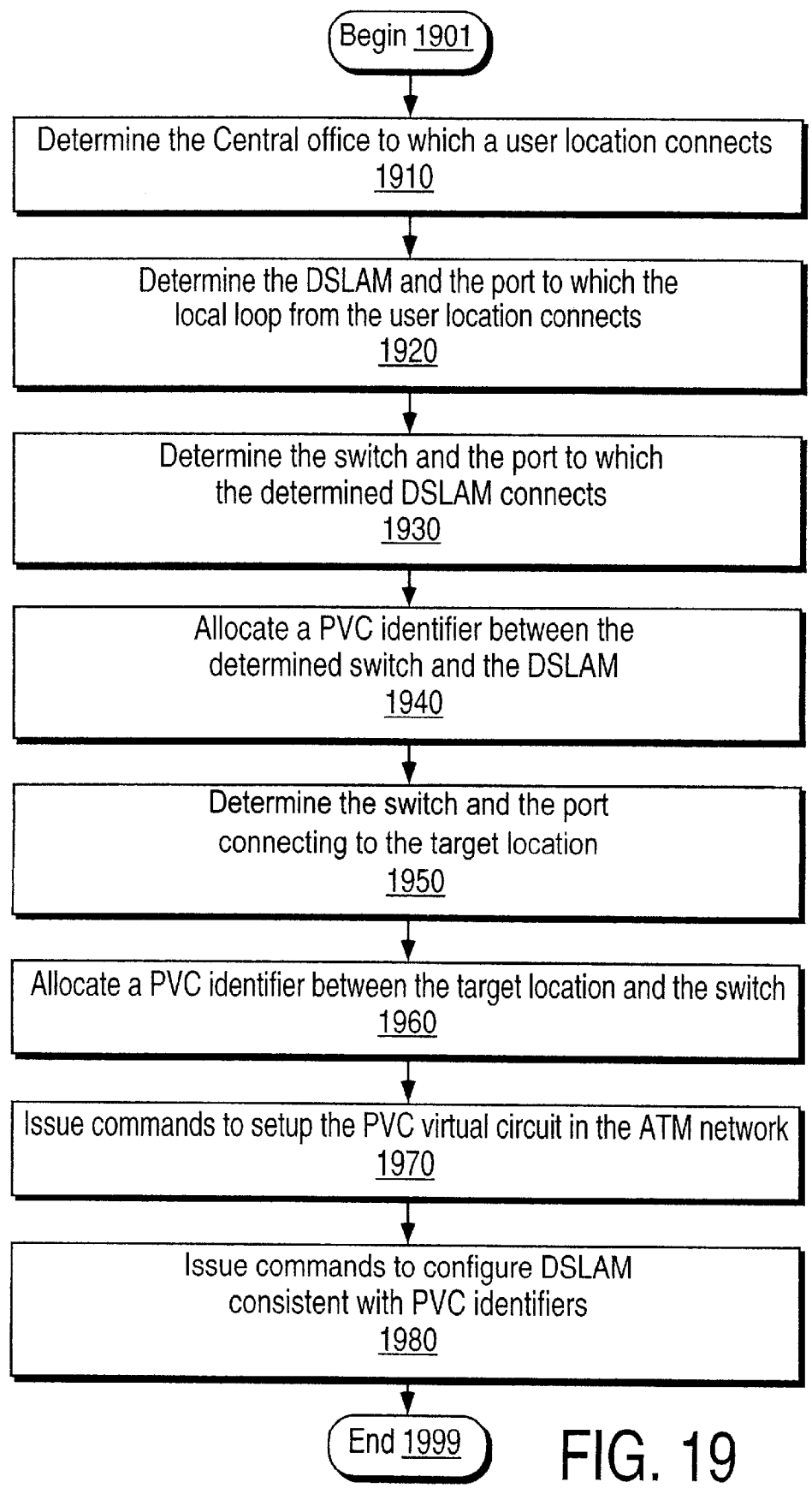
FIG. 19 is a flow-chart illustrating a method of provisioning a virtual circuit in accordance with the present invention.

FIG. 19 is a flow-chart illustrating a method according to which a PVC may be provisioned automatically when a request for a high bandwidth connection is received. The method of FIG. 19 is described with reference to FIG. 18 for illustration. Also, for illustration, it will be assumed that a requestor has requested service for user location 110-A (via line 342-C) to target network 170-A (via transmission line 157-A). The method begins in step 1901 in which control passes to step 1910.

In step 1910, computer system 500 may determine the central office to which the user location (to which high bandwidth connection is to be provided) is connected. The determination may be performed, for example, as described above with reference to FIG. 15. In step 1920, computer system 500 may determine the DSLAM (340 in the present example) and the port (347 in the present example) to which the local loop from the user location is connected. The determination may be performed, for example, as described in steps 1710 and 1720 of FIG. 17.

In step 1930, computer system 500 may determine the switch and the port to which the DSLAM determined in step 1920 is connected. Computer system 500 may store data indicative of the connectivity of various DSLAMs in each central office to the respective switches. In the present example, the data may indicate that DSLAM 340 is connected to port 1822 of switch 1820. In step 1940, computer system 500 may allocate a PVC identifier (VPI/VCI) for transmission and reception of data (related to the PVC being provisioned) on port 1822. The PVC identifier can be any arbitrary number not previously used on this port.

In step 1950, the port and switch connecting to the desired target location is determined. The desired target location may be specified at the time of order entry. When a target location is connected to service provider network 150, data indicating the specific port on the specific switch to which the target location is connected may be entered into computer system 500. Thus, in the present example, the stored data may indicate that target location 170-A is connected to port 1871.

In step 1960, a PVC identifier may be allocated for the transmission and reception of data (related to PVC being provisioned) on port 1871. In one embodiment, computer system 500 may make such an allocation. In an alternative embodiment, a requestor may assign the PVC identifier and communicate the identifier to computer system 500.

In step 1970, computer system 500 may provide to network manager 1830 the port identifier and PVC identifier on each of the transmissions line 341 and 157-A for the PVC, and cause network manager 1830 to provision a PVC. The provisioning may be performed in a known way.

In step 1980, computer system 500 may issue commands to DSLAM 347. One command may activate the port allocated to the local loop pair. Another command may configure DSLAM with the PVC identifier allocated for the PVC in step 1940. When forwarding cells on transmission line 341, DSLAM 340 uses the PVC identifier in the cell headers in a known way.

Computer system 500 may also coordinate the configuration of CPEs (not shown) at user location 110-A and target location 170-A. However, in one embodiment, the CPE at user location 110-A may use a default channel identifier, and thus may not require configuration related to the PVC identifiers, and the CPE at target location 170-A may be configured with the channel identifier allocated in step 1960.

Thus, using the method of FIG. 19, a PVC (or virtual circuit) may automatically be provisioned to a user location requiring a high bandwidth connection to a target network. The PVC may be provisioned automatically (without manual intervention) upon the reception of an order for the service. The PVC may be provisioned as soon as reception of order. However, the provisioning may be postponed to a later time also.

In addition, the present invention may be used while provisioning more than one virtual circuit to a user location. Due to such automatic provisioning (termed also as flow-through provisioning), a service provider may quickly and efficiently provision a PVC for providing high bandwidth connections.

Also, even though transport network 1850 is described as being managed by network manager 1830, it should be understood that network manager 1850 and computer system 500 may be integrated as one unit. Such an integration is particularly useful if transport network 1850 may also be managed based on standards. However, all of the above flow-charts may be implemented in a combination of one or more of hardware, software, and firmware as will be apparent to one skilled in the relevant arts based on the disclosure herein. Such other implementations are also contemplated to be within the scope and spirit of the present invention.

VIII. CONCLUSION

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of processing an order for a service specifying a high bandwidth connection from a user location to a remote target on a service provider network, said service being provided using digital subscriber loop technology (DSL), said order being received from a requester, said method comprising:

pre-qualifying said user location for said service, wherein pre-qualification refers to a preliminary determination of feasibility of said service, determining a resource which is required for the exclusive use of said user location to provide said service on said service provider network, said resource comprises a port on a DSL access multiplexor (DSLAM), said DSLAM is comprised in said service provider network; and reserving said resource for said user location;

wherein the results of said pre-qualification can be determined and sent quickly to said requester, and the actual feasibility of said high bandwidth connection can be determined later, and wherein reserving said resource enables a service provide to fulfill said order with an enhanced probability.

2. The method of claim 1, further comprising:

providing a form to said requestor, wherein said requester can specify said user location and said service using a web browser;

receiving data representing said user location and said service specified by said requestor;

wherein said pre-qualifying is based on the data received in said receiving data representing said user location.

3. The method of claim 1, further comprising:

providing a form to said requestor, wherein said requestor can specify said user location in said form;

receiving data representing said user location specified by said user, and wherein said pre-qualifying further comprises determining the types of services feasible to said user location; and sending data representing the types of services determined in said receiving data representing said user location specified by said user.

4. The method of claim 3, further comprises enabling said requestor to select from among the types of services sent in said sending data representing the types of services, wherein the selected type of service comprises said service for which said user location is qualified for.

5. The method of claim 3, wherein said form is provided on a web server by an Internet service provider, and wherein said requestor is a end user having said user location as a home.

6. The method of claim 5, further comprises:
receiving in said web server said data of said receiving data representing said user location;
forwarding said data received in said receiving data representing said user location to an operational support system provided by said service provider, wherein said operational support system performs said pre-qualifying and sends the results of pre-qualification to said web server, and wherein said web server sends said results of pre-qualification to said requestor.

7. The method of claim 6, wherein said web server forwards said data to said operational support system in extended meta language (XML).

8. The method of claim 3, wherein said user location is specified by an address of said user location.

9. The method of claim 3, wherein said user location is specified by a telephone number at said user location.

10. The method of claim 1, wherein a first type of DSL service is based on IDSL and a second type of DSL service is based on SDSL, and a third type of DSL service is based on SDSL, wherein said first, second, and third types of services are comprised in said different types of services.

11. The method of claim 10, wherein said port on said DSLAM is designed to support one of said three types of services, and said user location is qualified for said type of DSL service said DSLAM is designed to support.

12. A computer program product comprising a computer useable medium having computer program logic recorded thereon for enabling a processor in a computer system to process an order for a service specifying a high bandwidth connection to a user location, said service being provided using digital subscriber loop (DSL) technology, said order being placed by a requestor, said computer program logic comprising:
pre-qualification means for pre-qualifying said user location for said service, wherein pre-qualification refers to a preliminary determination of feasibility of said service,
determination means for determining a resource which is required for the exclusive use of said user location to provide said service on said service provider network; and
reservation means for reserving said resource for said user location;
wherein the results of said pre-qualification can be determined and sent quickly to said requestor, and the actual feasibility of said high bandwidth connection can be determined later,
and wherein reserving said resource enables a service provide to fulfill said order with an enhanced probability.

13. The computer program product of claim 12, wherein said resource comprises a port on a DSL access multiplexor (DSLAM), wherein said DSLAM is comprised in said service provider network.

14. The computer program product of claim 13, further comprising:
providing means for providing a form to said requestor, wherein said requestor can specify said user location and said service using a web browser;
receiving means for receiving data representing said user location and said service specified by said requestor;
wherein said pre-qualification means pre-qualifies said order based on the data received by said receiving means.

15. The computer program product of claim 13, further comprising:
providing means for providing a form to said requestor, wherein said requestor can specify said user location in said form;
receiving means for receiving data representing said user location specified by said user, and wherein said pre-qualification means determining the types of services feasible to said user location; and
sending means for sending data representing the types of services determined by said pre-qualification means.

16. An operational support system (OSS) for processing an order for a service specifying a high bandwidth connection from a user location to a remote target on a service provider network, said service being provided using digital subscriber loop technology (DSL), said order being received from a requestor, said operational support system comprising:
pre-qualification means for pre-qualifying said user location for said service, wherein pre-qualification refers to a preliminary determination of feasibility of said service,
determination means for determining a resource which is required for the exclusive use of said user location to provide said service on said service provider network; and
reservation means for reserving said resource for said user location;
wherein the results of said pre-qualification can be determined and sent quickly to said requestor, and the actual feasibility of said high bandwidth connection can be determined later,
and wherein reserving said resource enables a service provide to fulfill said order with an enhanced probability.

17. The OSS of claim 16, wherein said resource comprises a port on a DSL access multiplexor (DSLAM), wherein said DSLAM is comprised in said service provider network.

18. The OSS of claim 17, further comprising:
a data base for storing a form, wherein said form is sent to said requestor by said network interface, wherein said requestor can specify said user location and said service using a web browser;
receiving means for receiving data representing said user location and said service specified by said requestor;
wherein said pre-qualification means pre-qualifies said order based on the data received by said receiving means.

19. The OSS of claim 17, further comprising:
providing means for providing a form to said requestor, wherein said requestor can specify said user location in said form;
receiving means for receiving data representing said user location specified by said user, and wherein said pre-qualification means determining the types of services feasible to said user location; and
sending means for sending data representing the types of services determined by said pre-qualification means.

* * * * *